(12) United States Patent
Pang et al.

(10) Patent No.: US 11,446,634 B2
(45) Date of Patent: Sep. 20, 2022

(54) PCSTRUCTURES INCLUDING SUPPORTED POLYAMINES AND METHODS OF MAKING THE SUPPORTED POLYAMINES

(71) Applicants: Georgia Tech Research Corporation, Atlanta, GA (US); Global Thermostat Operations, LLC, New York, NY (US)

(72) Inventors: Simon H. Pang, Atlanta, GA (US); Christopher W. Jones, Atlanta, GA (US); Li-Chen Lee, Atlanta, GA (US); Miles A. Sakwa-Novak, Atlanta, GA (US); Michele Sarazen, Atlanta, GA (US)

(73) Assignees: Georgia Tech Research Corporation, Atlanta, GA (US); Global Thermostat Operations, LLC, New York, NY (US)

( * ) Notice: Subject to any disclaimer, the term of this patent is extended or adjusted under 35 U.S.C. 154(b) by 486 days.

(21) Appl. No.: 16/349,336

(22) PCT Filed: Nov. 14, 2017

(86) PCT No.: PCT/US2017/061444
§ 371 (c)(1),
(2) Date: May 13, 2019

(87) PCT Pub. No.: WO2018/089968
PCT Pub. Date: May 17, 2018

(65) Prior Publication Data
US 2019/0291077 A1 Sep. 26, 2019

Related U.S. Application Data

(60) Provisional application No. 62/421,463, filed on Nov. 14, 2016.

(51) Int. Cl.
| | | |
|---|---|---|
| *B01D 53/02* | (2006.01) | |
| *B01J 20/26* | (2006.01) | |
| *B01D 53/04* | (2006.01) | |
| *B01J 20/08* | (2006.01) | |
| *B01J 20/10* | (2006.01) | |
| *B01J 20/28* | (2006.01) | |
| *B01D 71/02* | (2006.01) | |
| *B01J 20/32* | (2006.01) | |
| *B01D 69/14* | (2006.01) | |
| *B01D 71/80* | (2006.01) | |
| *B01D 67/00* | (2006.01) | |
| *B01D 71/60* | (2006.01) | |

(52) U.S. Cl.
CPC .......... *B01J 20/262* (2013.01); *B01D 53/025* (2013.01); *B01D 53/04* (2013.01); *B01D 69/148* (2013.01); *B01D 71/028* (2013.01); *B01J 20/08* (2013.01); *B01J 20/103* (2013.01); *B01J 20/28035* (2013.01); *B01J 20/28045* (2013.01); *B01J 20/28069* (2013.01); *B01J 20/28078* (2013.01); *B01J 20/3204* (2013.01); *B01J 20/3236* (2013.01); *B01J 20/3272* (2013.01); *B01J 20/3289* (2013.01); *B01D 53/0462* (2013.01); *B01D 67/0079* (2013.01); *B01D 71/60* (2013.01); *B01D 71/80* (2013.01); *B01D 2253/202* (2013.01); *B01D 2253/25* (2013.01); *B01D 2257/504* (2013.01); *B01D 2258/0283* (2013.01); *B01D 2258/06* (2013.01); *Y02C 20/40* (2020.08)

(58) Field of Classification Search
CPC .......... B01D 2253/202; B01D 2253/25; B01D 2257/504; B01D 2258/0283; B01D 2258/06; B01D 53/025; B01D 53/04; B01D 53/0462; B01D 71/028; B01D 71/60; B01D 71/80; B01J 20/08; B01J 20/103; B01J 20/262; B01J 20/28035; B01J 20/28045; B01J 20/28069; B01J 20/28078; B01J 20/3204; B01J 20/3236; B01J 20/3272; B01J 20/3289; Y02C 10/04; Y02C 10/08; Y02C 20/40
See application file for complete search history.

(56) References Cited

U.S. PATENT DOCUMENTS

| | | |
|---|---|---|
| 3,716,063 A | 2/1973 | Litzinger |
| 4,822,383 A | 4/1989 | Brose et al. |
| 5,376,614 A | 12/1994 | Birbara et al. |
| 5,876,488 A | 3/1999 | Birbara et al. |
| 6,364,938 B1 | 4/2002 | Birbara et al. |
| 6,670,304 B2 | 12/2003 | Chang |
| 7,288,136 B1 | 10/2007 | Gray et al. |
| 7,767,004 B2 | 8/2010 | Sayari et al. |
| 7,795,175 B2 | 9/2010 | Olah et al. |
| 8,298,986 B2 | 10/2012 | Jones et al. |
| 8,377,173 B2 | 2/2013 | Chuang |
| 8,470,074 B2 | 6/2013 | Baugh et al. |

(Continued)

FOREIGN PATENT DOCUMENTS

CN 102068967 A 5/2011

OTHER PUBLICATIONS

Translation of CN 102068967; Linbo Wu (Year: 2011).*
(Continued)

*Primary Examiner* — Christopher P Jones
(74) *Attorney, Agent, or Firm* — Thomas | Horstemeyer, LLP

(57) ABSTRACT

Methods of making a poly(propylenimine) (PPI) sorbent, a PPI sorbent, structures including the PPI sorbent, methods of separating $CO_2$ using the PPI sorbent, and the like, are disclosed.

22 Claims, 10 Drawing Sheets

(56) References Cited

U.S. PATENT DOCUMENTS

| | | |
|---|---|---|
| 8,491,705 B2 | 7/2013 | Choi et al. |
| 9,533,250 B2 | 1/2017 | Meirav et al. |
| 2005/0014060 A1 | 1/2005 | Suzuki |
| 2008/0264254 A1 | 10/2008 | Song et al. |
| 2011/0150730 A1 | 6/2011 | Baugh et al. |
| 2011/0226697 A1 | 9/2011 | McLellan et al. |
| 2012/0076711 A1 | 3/2012 | Gebald et al. |
| 2013/0095999 A1 | 4/2013 | Chaikittisilp et al. |
| 2013/0287662 A1 | 10/2013 | Chuang |
| 2013/0294991 A1 | 11/2013 | Jones et al. |
| 2014/0241966 A1 | 8/2014 | Khunsupat et al. |

OTHER PUBLICATIONS

International Search Report for PCT/US2017/06144 dated Jan. 25, 2018.

Office Action for EP Patent Application No. 17 870 343.5-1011, dated Apr. 6, 2021.

Sarazen, M. L. and Jones, C. W. "Insights into Azetidine Polymerization for Preparation of Poly(propyleneimine)-based $CO_2$ Adsorbents," Macromolecules, 2017, 50, 9135-9143.

Pang, S. H., "Design of Aminopolymer structure to Enhance Performance and Stability of $CO_2$ Sorbents: Poly (propyleneimine) vs. Poly(ethylenimine)". AIChE Annual Meeting (Minneapolis, MN, Oct. 30, 2017).

Pang, S. H., Lively, R. P., Jones, C. W. "Oxidatively-stable Linear Poly(propylenimine)—Containing Adsorbents for $CO_2$ Capture from Ultra-Dilute Streams," ChemSusChem, 2018, 11, 2628-2637.

Sarazen, M. L., Sakwa-Novak, M. A., Ping, E.W. and Jones, C. W. "Effect of Different Acid Initiators on Branched Poly (propylenimine) Synthesis and $CO_2$ Sorption Performance," ACS Sustainable Chem. Eng., 2019, 7, 7338-7345.

Sarazen, M. L., Pang, S. H. and Jones, C. W. "Development of oxidatively stable aminopolymer-based sorbents for $CO_2$ capture. Carbon Capture", Utilization & Storage Gordon Research Seminar, New London, NH. Jun. 10, 2017 (poster presentation).

Pang, S. H., Lee, L.-C., Sakwa-Novak, M. A., Lively, R. P., Jones, C. W. "Design of Aminopolymer Structure to Enhance Performance and Stability of $CO_2$ Sorbents: Poly(propylenimine) vs. Poly(ethylenimine)," J. Am. Chem. Soc., 2017, 139, 3627-3630.

Pang, S. H., "Poly(alkylimines) for $CO_2$ Capture from Ambient Air". AIChE Annual Meeting (San Francisco, CA, Nov. 16, 2016).

Pang, S. H., "Improving Aminopolymer-Based Solid Adsorbents for Direct Air Capture". Gordon Research Conference on Carbon Capture, Utilization and Sequestration (Les Diablerets, Switzerland, May 4, 2019).

Sarazen, M. L. Pang, S. H. and Jones, C. W. "Development of aminopolymer-based sorbents for $CO_2$ capture with improved capacity and oxidative stability". American Institute of Chemical Engineers Meeting, Minneapolis, MN. Nov. 1, 2017 (oral presentation).

Sarazen, M. L. and Jones, C. W. "Aminopolymer synthesis, characterization, and use in composite sorbents for $CO_2$ capture". American Chemical Society Spring National Meeting, New Orleans, LA. Mar. 21, 2018 (oral presentation).

European Search Report for EP Patent Application No. 17 870 343.5-1011, dated May 25, 2020.

\* cited by examiner

Structure A

Structure B

Structure C

Structure D

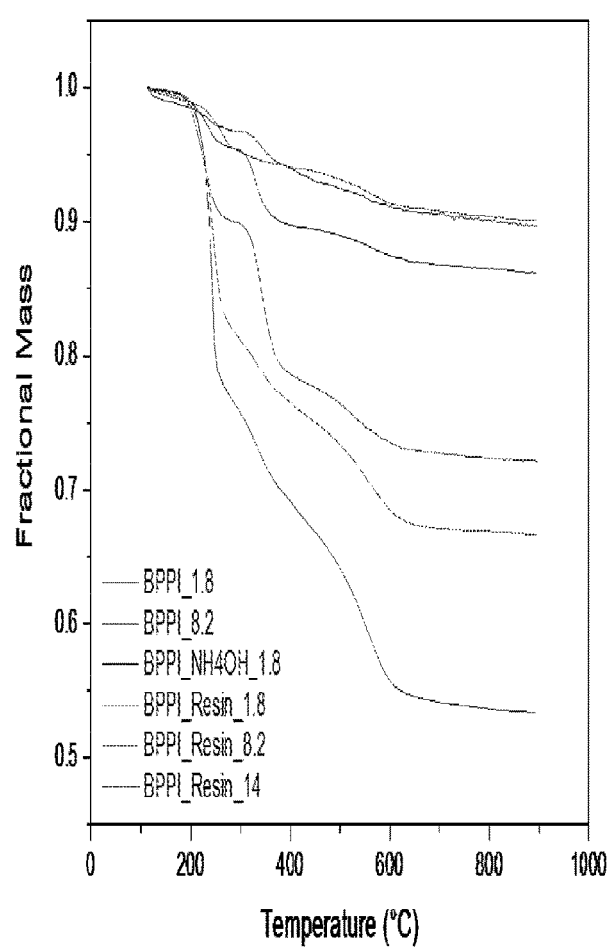 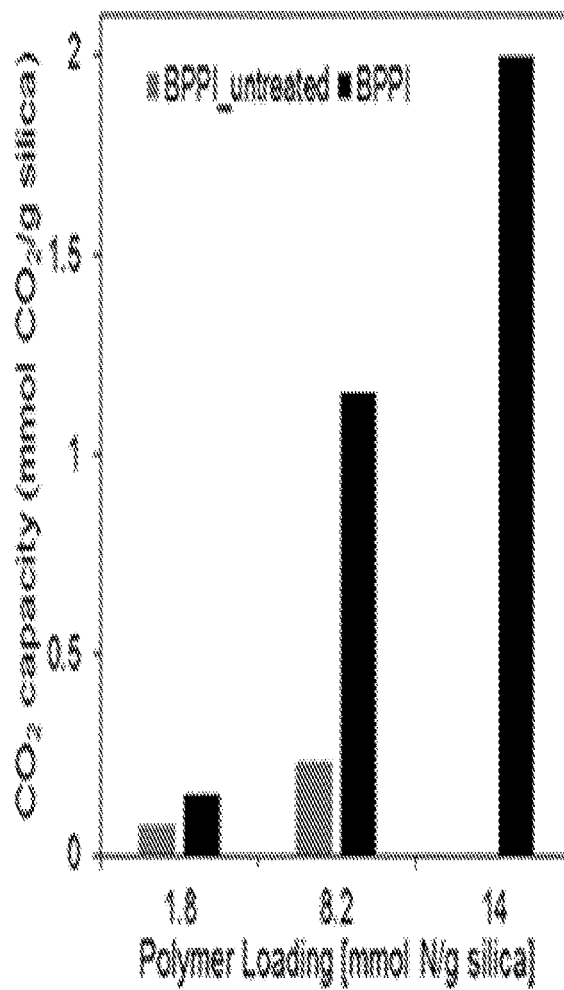
Fig. 13
Fig. 14

STRUCTURES INCLUDING SUPPORTED POLYAMINES AND METHODS OF MAKING THE SUPPORTED POLYAMINES

CLAIM OF PRIORITY TO RELATED APPLICATION

This application is the 35 U.S.C. § 371 national stage application of PCT Application No. PCT/US2017/061444, filed Nov. 14, 2017, where the PCT claims priority to U.S. provisional application entitled "Poly(propylenimine) and dendritic poly(ethylenimine) for $CO_2$ capture in composite sorbents" having Ser. No. 62/421,463, filed on Nov. 14, 2016, both of which are herein incorporated by reference in their entireties.

BACKGROUND

Supported amines are of particular importance because these materials can be applied in a wide variety of potential applications such as base-catalyzed reactions, adsorption of heavy metal ions, immobilization of bio-molecules, and carbon dioxide ($CO_2$) capture. Incorporation of amine moieties into/onto the support frameworks has been achieved but limitations still remain.

SUMMARY

Methods of making a poly(propylenimine) (PPI) sorbent, a PPI sorbent, structures including the PPI sorbent, methods of separating or capturing $CO_2$ using the PPI sorbent, and the like, are disclosed.

In an embodiment, the present disclosure includes a material comprising including a porous structure. The porous structure can have supported thereon at least one of: a) a poly(propylenimine) (PPI) sorbent, wherein the PPI sorbent is in a plurality of pores of the porous structure, wherein the PPI sorbent can include a linear PPI, a dendritic PPI, or both the linear PPI and the dendritic PPI; b) a poly(propylenimine) (PPI) sorbent, wherein the PPI can be physically impregnated in the porous structure and not covalently bonded to the porous structure; and c) a poly(propylenimine) (PPI) sorbent, wherein the PPI sorbent can be in a plurality of pores of the porous structure, the PPI has one or both of a loading of about 10% to 75% by weight of the composite and a counterion content of less than about 0.1 mol counterion/mol amine or a combination thereof. In an aspect the PPI sorbent is a linear PPI or a dendritic PPI. In a particular aspect the PPI sorbent is a linear PPI.

In an embodiment, the present disclosure includes a method of capturing $CO_2$, including exposing a gas mixture to a porous structure. The method includes: a) a poly(propylenimine) (PPI) sorbent, wherein the PPI sorbent can be in a plurality of the pores of the porous structure, wherein the PPI sorbent can include a linear PPI, a dendritic PPI, or both the linear PPI and the dendritic PPI; b) a poly(propylenimine) (PPI) sorbent, wherein the PPI can be physically impregnated in the porous structure and not covalently bonded to the porous structure; and/or c) a poly(propylenimine) (PPI) sorbent, wherein the PPI sorbent can be in a plurality of pores of the porous structure, wherein the PPI has one or both of a loading of about 10% to 75% by weight of the composite and a counterion content of less than about 0.1 mol counterion/mol amine or a combination thereof; and capturing the $CO_2$ in the porous structure. In an aspect the PPI sorbent is a linear PPI or a dendritic PPI. In a particular aspect the PPI sorbent is a linear PPI.

Other structures, methods, structures, features, and advantages will be, or become, apparent to one with skill in the art upon examination of the following drawings and detailed description. It is intended that all such additional structures, systems, methods, features, and advantages be included within this description, be within the scope of the present disclosure, and be protected by the accompanying claims.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of this disclosure. Moreover, in the drawings, like reference numerals designate corresponding parts throughout the several views.

FIG. 1A provides Structure A, which is an illustrative non-limiting example, where n can be 1 to 10,000, and $R_1$ and $R_2$ can each independently be H or an alkyl group such as $CH_3$ or $CH_2$. FIG. 1B provides Structure B, which is an illustrative non-limiting example, where n can be 1 to 10,000.

FIG. 2A is a "first generation" dendritic PPI (Structure C) and FIG. 2B shows a "second generation" dendritic PPI (Structure D).

FIG. 13 provides an example of TGA of resin-neutralized BPPI, $NH_4OH$-neutralized BPPI, and untreated BPPI impregnated in SBA-15 at various weight loadings (from 9%-45%, corresponding to roughly 2-14 mmol N per gram SBA-15).

FIG. 14 is an example of $CO_2$ capacity (mmol $CO_2$/g silica) for BPPI polymers (initial azetidine:perchloric acid concentration ratio=3.7 and temperature=343 K, after 144 hours polymerization) loaded in SBA-15: (gray) untreated and (black) neutralized by basic resin at different polymer loadings: 1.8 and 8.2 mmol N/g silica.

DETAILED DESCRIPTION

Figure 1A:
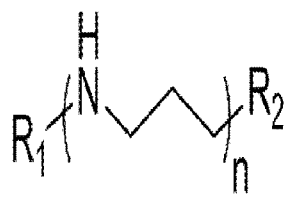
FIGS. 1A-B are examples of structures of compounds.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, organic chemistry, inorganic chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a compound" includes a plurality of compounds. In this specification and in the claims that follow, reference will be made to a number of terms that shall be defined to have the following meanings unless a contrary intention is apparent.

Definitions:

The term "alkyl" refers to straight or branched chain hydrocarbon groups having 1 to 20 carbon atoms such as methyl, ethyl, n-propyl, i-propyl, n-butyl, i-butyl, t-butyl, pentyl, hexyl, heptyl, octyl, and the like. The alkyl group can be substituted (e.g., a halogen).

Discussion

Methods of making a poly(propylenimine) (PPI) sorbent, a PPI sorbent, structures including the PPI sorbent, methods of separating $CO_2$ using the PPI sorbent, and the like, are disclosed. In an aspect, the PPI sorbent can be used to adsorb $CO_2$ in one or more $CO_2$ capture applications. In one aspect, the PPI sorbent can be used to capture $CO_2$ in gas streams including a low concentration (e.g., about 400 ppm, as in ambient air in most locations around the world) of $CO_2$. In another aspect, the PPI sorbent can be used to capture $CO_2$ in gas streams including high concentrations of $CO_2$ (e.g., 1 to 15%, such as in flue gas), or intermediate compositions of $CO_2$ from about 0.5% to about 1%. As a result, embodiments of the present disclosure can be used in different types of $CO_2$ concentration environments.

Relative to other $CO_2$ sorbents, embodiments of the present disclosure show equivalent or superior absorption characteristics, while exhibiting excellent stability to oxidative degradation. In particular, embodiments of the present disclosure are advantageous over PEI sorbents for one or more of the foregoing reasons.

In an embodiment, the PPI sorbent can be used to adsorb $CO_2$. In this regard, embodiments of the present disclosure can be used to remove (e.g., capture) $CO_2$ from a gas produced by the use (e.g., burning) of fossil fuels (e.g., flue gas) from $CO_2$ in the ambient air, or mixtures of these. The PPI sorbent can be regenerated for regenerative adsorption processes. In this regard, the PPI sorbent has the ability to adsorb and desorb $CO_2$ repeatedly by temperature swing, pressure swing, steam swing, concentration swing, combinations thereof, or other dynamic processes. In an embodiment, the steam swing process can include exposing the structure to steam, where the temperature of the steam is about 60° C. to 150° C. and the pressure of the steam is about 0.2 bara to 5 bara.

In a particular aspect, the structure can have a high surface area (e.g., porous layers and/or porous structure surface) and the PPI sorbent enables the structure to have a high $CO_2$ sorption capacity. In an embodiment, the PPI sorbent is within the pore volume of the pores of the porous layers and/or porous structure surface. In an aspect, the pores (e.g., mesopores) may not be overfilled by the PPI sorbent, so there exists suitable space for the transport of gases through the pores via diffusion, although other gas transport processes can occur (e.g., advection, convection, and the like). In another aspect, the pores (e.g., mesopores) can be substantially filled by the PPI sorbent and still function to adsorb $CO_2$. It is also contemplated that a system can be used where the transport of gases is through a pressure drop through the pores. In other embodiments where the pore size is sufficiently large and/or the material is a monolith, the gas can contact the PPI sorbent by controlling the flow of the gas relative to the orientation of the material to enhance the performance of the material. Additional details are provided for the structures herein.

In an embodiment, the PPI sorbent can be physically impregnated in the internal volume pores of the porous structure and not covalently bonded to the internal surface of the pores of the porous structure, can be grafted (e.g., covalently bonded directly or indirectly) to the internal surface of the pores of the porous structure, or a combination thereof. In an embodiment, the PPI sorbent can be covalently bonded (e.g., directly to the surface or via a linker group) to the surface of the material, which may include the internal surface of pores for a porous layer or porous structure, although the PPI sorbent can be otherwise bonded or attached to the surface (e.g., Van der Waals, ionic bonds or hydrogen bonds). In an aspect, the covalent bonding can be achieved using known techniques in the art for PPI and PEI. In regard to the PPI sorbent being physically impregnated in the pores of the porous structure and not covalently bonded to the internal surface of the pores of the porous structure, the PPI can otherwise be bonded or attached to the surface (e.g., Van der Waals, ionic bonds or hydrogen bonds).

In an embodiment, the PPI sorbent is present in a plurality of pores (internal volume) of the porous structure ("porous structure" can include a structure having pores in its surface or a structure having a porous layer or coating on the surface of the structure (where the structure itself may or may not be porous)). In this embodiment, the PPI sorbent can be a linear PPI, a dendritic PPI, or the structure can include both linear PPI and dendritic PPI, each of which are described in more detail herein. In this embodiment, the PPI sorbent can be physically impregnated in the internal volume of the porous structure and not covalently bonded to the internal surface of the porous structure, can be grafted to the internal surface of the pores of the porous structure, or a combination thereof. In this embodiment, the PPI has one or both of a loading of about 10% to 75% by weight of the composite and a counterion content of less than about 0.1 mol counterion/mol amine or a combination thereof.

In regard to the loading, the loading is determined by thermogravimetric analysis (TGA). A brief written description of this is given in Example 5. Also given in Example 5 is a figure showing TGA mass loss curves for the dendritic and low molecular weight linear PPI. Example 13 shows TGA mass loss curves for the higher MW linear PPI. Example 19 shows mass loss curves for branched PPI.

In regard to the counterion, the counterion content is determined from elemental analysis of the supported polymer, whereas for perchloric acid initiated polymerization of branch-PPI, the mol of Cl per mol of N was calculated. This is described in Example 20, and a table of counterion content is provided as table 1. In an aspect the counterion can be one or more of: perchlorate, chlorine, nitrate, ((di)hydrogen) phosphate, (bi)sulfate, or trifluoroacetate. In an aspect, the counterion can come from perchloric acid, hydrochloric acid, nitric acid, phosphoric acid, sulfuric acid, trifluoroacetic acid, which may be used as an initiator in the polymerization to create the PPI.

In another embodiment, the PPI sorbent is present in a plurality of pores (internal volume) of the porous structure ("porous structure" can include a structure having pores in its surface or a structure having a porous layer or coating on the surface of the structure (where the structure itself may or may not be porous)), where the PPI is physically impregnated in the internal volume of the porous structure and not covalently bonded to the internal surface of the pores of the porous structure. In this embodiment, the PPI sorbent can be a linear PPI, a dendritic PPI, a branched PPI, hyperbranched PPI, or a combination thereof, each of which are described in more detail herein. In this embodiment, the PPI has one or both of a loading of about 10% to 75% by weight of the composite and a counterion content of less than about 0.1 mol counterion/mol amine or a combination thereof.

In yet another embodiment, the PPI sorbent is present in a plurality of pores (internal volume) of the porous structure ("porous structure" can include a structure having pores in its surface or a structure having a porous layer or coating on the surface of the structure (where the structure itself may or may not be porous)), where the PPI has one or both of a loading of about 10% to 75% by weight of the composite and a counterion content of less than about 0.1 mol counterion/mol amine or a combination thereof. In this embodiment, the PPI sorbent can be physically impregnated in the internal volume of the pores of the porous structure and not covalently bonded to the internal surface of the pores of the porous structure, can be grafted to the internal surface of the pores of the porous structure, or a combination thereof. In this embodiment, the PPI sorbent can be a linear PPI, a dendritic PPI, a branched PPI, or hyperbranched PPI, or a combination thereof, which are described in more detail herein.

In general, PPI can be defined as having a repeat structure —(NR—$CH_2$—$CH_2$—$CH_2$)—, where R can be H or $CH_2$, and also having one or more units: $H_xN$—$CH_2$—$CH_2$—$CH_2$, where x=0, 1, or 2, and zero or more units: —$CH_3$. Illustrative examples of PPI include linear PPI, dendritic PPI, branched PPI, and hyperbranched PPI, which are described in more detail below.

Primary amines are defined as having the structure —$NH_2R^1$, where $R^1$ is an alkyl group such as $CH_2$ or $CH_3$. Secondary amines are defined as having the structure —$NHR^1R^2$, where $R^1$ and $R^2$ are independently selected from H or an alkyl group such as $CH_2$ or $CH_3$. Tertiary amines are defined as having the structure —$NR^1R^2R^3$, where $R^1$, $R^2$, and $R^3$ are independently selected from H or an alkyl group such as $CH_2$ or $CH_3$.

In an aspect, a linear PPI is defined as containing only primary amines, secondary amines, or both primary and secondary amines (e.g., structure A, shown in FIG. 1A, is an illustrative non-limiting example, where n can be 1 to 10,000, and $R_1$ and $R_2$ can each independently be H or an alkyl group such as $CH_3$ or $CH_2$). The ratio of secondary to primary amines can be about 0.5 to 10,000. In an aspect, the linear PPI can have a molecular weight of about 200 to 30,000 g/mol or about 600 to 5,000 g/mol.

Figure 1B:
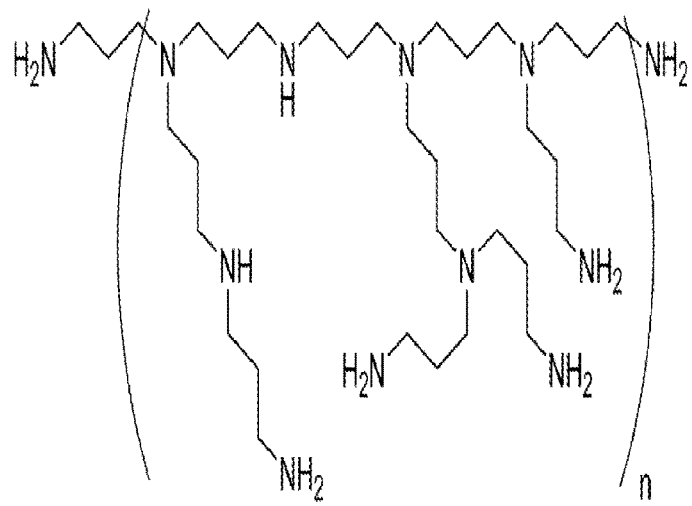

In an aspect, a branched PPI is defined as containing any number of primary, secondary, and tertiary amines (e.g., structure B, shown in FIG. 1B, is an illustrative non-limiting example, where n can be 1 to 10,000), which does not overlap linear PPI or dendritic PPI. The ratio of primary, secondary, and tertiary can be about 10:80:10 to 60:10:30, about 60:30:10 to 30:50:20, or about 45:45:10 to 35:45:20. As one of skill would understand, the structures of branched PPI can vary greatly and can be very complex. In an aspect, the branched PPI can have a molecular weight of about 200 to 30,000 g/mol or about 600 to 5,000 g/mol.

Figure 2A:
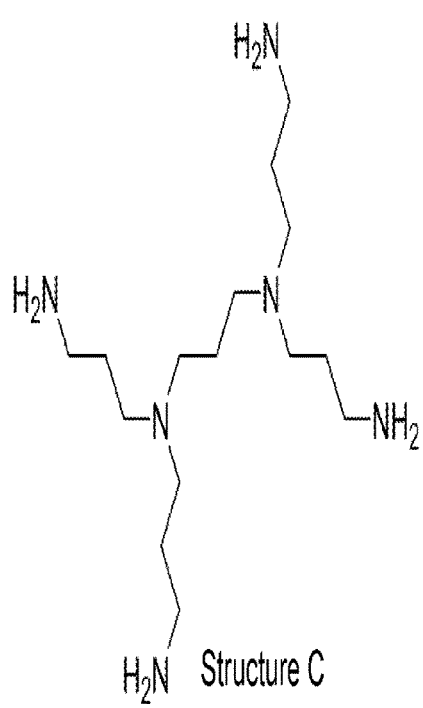
FIGS. 2A-B illustrate non-limiting embodiments of dendritic PPI.
Figure 2B:
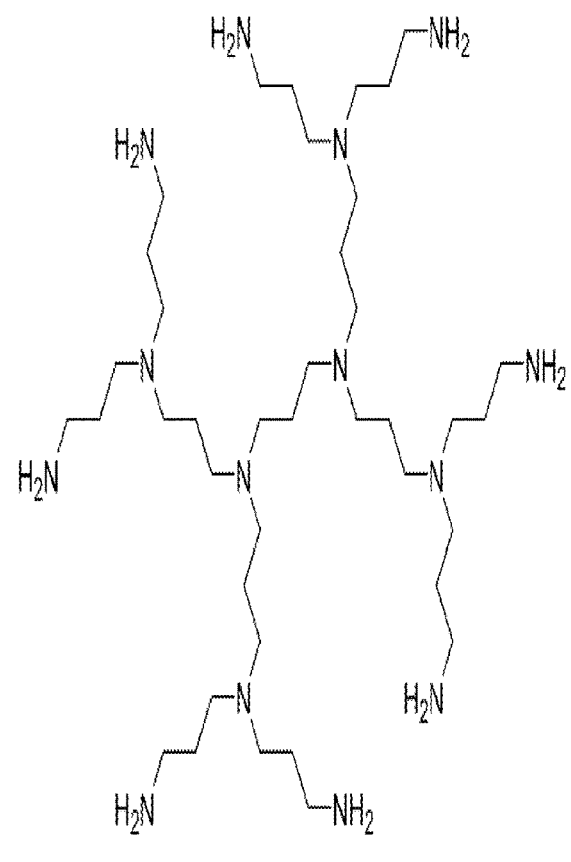

In an aspect, a dendritic PPI is defined as containing only primary and tertiary amines, where groups of repeat units are arranged in a manner that is necessarily symmetric in at least one plane through the center (core) of the molecule, where each polymer branch is terminated by a primary amine, and where each branching point is a tertiary amine. The ratio of primary to tertiary can be about 1 to 3. Illustrative non-limiting embodiments of dendritic PPI are illustrated below. On the left is a "first generation" dendritic PPI (Structure C, FIG. 2A) and on the right a "second generation" dendritic PPI (Structure D, FIG. 2B) is shown. In an aspect, the dendritic PPI can have a molecular weight of about 200 to 30,000 g/mol or about 280 to 3,000.

In an aspect, the PPI is a hyperbranched PPI. Hyperbranched PPI is defined as having structure resembling dendritic PPI, but containing defects in the form of secondary amines (e.g. linear subsections as would exist in a branched polymer), in such a way that provides a random structure instead of a symmetric structure. The hyperbranched PPI does not overlap branch PPI or dendritic PPI. In a hyperbranched structure, the ratio of primary to secondary to tertiary can be about 65:5:30 to 30:10:60. In an aspect, the hyperbranched PPI can have a molecular weight of about 200 to 30,000 g/mol or about 600 to 10,000 g/mol.

In a particular aspect, the PPI is a linear PPI or a dendritic PPI. In a more particular embodiment the PPI is a linear PPI.

In an embodiment, the size (e.g., length, molecular weight), amount (e.g., number of distinct PPI sorbent polymers), and/or type of PPI sorbent polymer, can be selected based on the desired characteristics of the porous structure (e.g., $CO_2$ absorption, regenerative properties, oxidative stability, loading, and the like).

In general, the structure can include powders, a pellet, a foam, a laminate, an extrudate particle, a film, a sheet, a mesh, a foil, flakes, a wire, a rod, a monolith, a honeycomb structure, or combinations thereof. In an aspect, the structure can be porous or non-porous or have porous and non-porous areas. In an embodiment, the structure is a porous structure. In an aspect, the structure can be gas permeable scaffold that gas can be flow through and/or over the surface over to capture $CO_2$. In an aspect, the structure can be made of a material that is hydrothermally stable.

In an embodiment, the structure can be made of one or more types of materials such as ceramic, metal, metal oxide, plastic, cellulose, carbon, or fiberglass. In an aspect, the ceramic structure can be selected from cordierite, alumina (eg., γ-alumina, θ-alumina, δ-alumina), cordierite-α-alumina, silica, aluminosilicates, zirconia, germania, magnesia, titania, hafnia, silicon nitride, zircon mullite, spodumene, alumina-silica magnesia, zircon silicate, sillimanite, magnesium silicates, zircon, petalite, and combinations thereof in an aspect, the metal or metal oxide structure can be aluminum, titanium, stainless steel, a Fe—Cr alloy, or a Cr—Al—Fe alloy. In cases where the oxide contains a formal charge, the charge can be balanced by appropriate counter-ions, such as cations of $NR_4$, Na, K, Ca, Mg, Li, H, Rb, Sr, Ba, Cs or anions including phosphate, phosphite, sulfate, sulfate, nitrate, nitrite, chloride, bromide and the like.

In an aspect, the plastic structure can be a polymer and/or copolymer of polyolefin(s), polyester(s), polyurethane(s), polycarbonate(s), polyetheretherketone(s), polyphenylene oxide(s), polyether suifone(s), inelamnine(s), polyarnide(s), polyacrylates, polystyrenes, polyacrylonitriles, polyimides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, and agarose, or combinations thereof.

In an embodiment, the structure can include porous structures (e.g., macroporous, mesoporous, microporous, or mixtures thereof (e.g., where a macroporous surface can include mesopores, and/or micropores, within one or more of the macropores, where a mesoporous surface can include micropores, and so on)). In an aspect, the porous structure is mesoporous. In an aspect, the pores can extend through the porous structure or porous layer or only extend to a certain depth. In an aspect, the macropores of the porous structure can have pores having a diameter of about 100 nm to 10,000 nm, a length of about 500 nm to 100,000 nm and a volume of 0.2-1 cc/g. In an aspect, the mesopores of the porous structure can have pores having a diameter of about 5 nm to 100 nm, a length of about 10 nm to 10,000 nm, and a volume of 0.5-2 cc/g. In an aspect, the micropores of the porous structure can have pores having a diameter of about 0.5 to 5 nm, a length of about 0.5 nm to 1000 nm and a volume of about 0.1-1 cc/g.

In an aspect, the surface of the structure can have porous walls that have a porosity of at least 90%, at least 85%, at least 80%, at least 75%, at least 70%, at least 65%, at least 60%, or about 60 to 90% In some embodiments, the porous walls of the flow-through substrate have a surface area of 100 $m_2$/g or more, 150 $m^2$/g or more, 200 $m^2$/g or more, or 250 $m^2$/g or more.

In an embodiment, the substrate can include a surface layer on the surface of the pores of the substrate that can bond with the PPI. In an aspect, the surface layer can include organically modified moieties (e.g., alkyl groups, hydroxyl groups, carboxylate groups, amines, phosphoric acid, sulfonic acid, thiols, phosphines, and the like) on the surface (e.g., outside and/or inside surfaces of pores) of the material. In an embodiment, the surface layer can include surface alkyl groups hydroxyl groups, carboxylate groups, amines, phosphoric acid groups, sulfonic acid groups, thiols, phosphines, and the like, that the PPI can directly covalently bond and/or indirectly covalently bond (e.g., covalently bond to a linker covalently bonded to the material). In an embodiment, the surface layer can include an organic polymer having one or more of the following groups: alkyl groups, hydroxyl groups, carboxylate groups, amines, phosphoric acid groups, sulfonic acid groups, thiols, phosphines, and the like. In another embodiment, the structure can be a carbon support, where the carbon support can include one or more of the following groups: alkyl groups, hydroxyl groups, carboxylate groups, amines, phosphoric acid groups, sulfonic acid groups, thiols, phosphines, and the like.

In an aspect, the substrate can include a porous coating (also referred to as a "washcoat") on the surface of the substrate. In an embodiment, the porous coating can be a foam such as a polymeric foam (e.g., polyurethane foam, a polypropylene foam, a polyester foam, and the like), a metal foam, or a ceramic foam. In an aspect, the porous coating can include a metal-oxide layer such as silica or alumina on the surface of the substrate. In an aspect, the porous coating can be present on the surface of the substrate, within the pores or voids of the substrate, or a combination thereof. In an embodiment, the porous coating can be about 100 μm to 1500 μm thick and the pores can be of the dimension described above and herein. In an aspect, the substrate can be a porous substrate and can also include the porous coating on some or all parts of the porous substrate, where the PPI can be present in one or both of the pores of the porous substrate and the porous coating.

In an embodiment, the preferred structure can be a honeycomb structure such as a monolith honeycomb structure that includes channels. In an aspect, the monolith honeycomb structure can have a length and width on the order of cm to rn while the thickness can be on the order of mm to cm or more. In an aspect, the monolith honeycomb structure does not have fibrous dimensions. In other words, the honeycomb structure can be a flow-through substrate comprising open channels defined by walls of the channels. In an aspect, channels can have about 50 to about 900 cells per square inch. In an aspect, the channels can be polygonal (e.g., square, triangular, hexagonal) sinusoidal, circular, or the like, in cross-section. The length of the channels can be straight, zig-zag, skewed, or herringbone in shape and can have a length of 1 mm to 10 s of cm or more. The channels can have walls that are perforated or louvered. In an aspect, the PPI can be disposed in the pores of the honeycomb structure and/or in the pores of a porous layer on the surface of the honeycomb structure.

In an embodiment, the honeycomb structure can comprise an inlet end, an outlet end, and inner channels extending from the inlet end to the outlet end. In some embodiments, the honeycomb comprises a multiplicity of cells extending from the inlet end to the outlet end, the cells being defined by intersecting cell or channel walls.

In an aspect, the honeycomb structure is ceramic (e.g., of a type produced by Corning under the trademark Celcor®) that can be used with the PPI sorhent in accordance with the principles of the present disclosure. The PPI sorhent can be coated or otherwise immobilized on the inside of the pores of the ceramic honeycomb structure and/or within a porous layer on the surface of the ceramic honeycomb structure. In an aspect, the porous coating can include a metal-oxide layer such as silica or alumina on the surface of the substrate. In an embodiment, the metal-oxide layer can be mesoporous.

In a preferred embodiment, the ceramic substrates form part of a system having elements for moving the monolithic ceramic substrates between a position where sorbent on the monolithic structure is exposed to ambient air from which $CO_2$ can be extracted by the sorbent, and a position where the sorbent can be regenerated and the $CO_2$ captured. This regeneration preferably is carried out in a sealed regeneration chamber, where the carbon dioxide-laden sorbent is exposed to process heat steam at a temperature not greater than 100-120° C.; the thus released $CO_2$ is withdrawn from the regeneration chamber for storage or further treatment.

Alternatively, the structure can be a stationary bed of particulate porous material such as a ceramic held together in a support that is open to a flowing gaseous mixture but effective to hold the stationary bed in place when exposed to the gas flow, e.g., ambient air, to adsorb the carbon dioxide from the air, or when exposed to process heat steam to regenerate the sorbent and release the carbon dioxide. Details of such a system and the method for carrying out the sorption and regeneration, are set forth in, for example, U.S. Pat. No. 9,028,592; or in US patent application publication number US 2015/0273385, which are incorporated herein by reference as if fully repeated herein. Such individual discrete particles can include a powder, an extrudate particle, flakes or spheres.

The individual particles can also form a moving bed where the individual particles are moved either by gas flow or by a moving belt for example between a position where they will be exposed to a gas mixture containing carbon dioxide and a position where the sorbent is regenerated and the freed carbon dioxide is captured for further storage or processing.

Such particulate forms of the substrate can be utilized regardless of the materials forming the particles, but the particles are preferably formed of a ceramic, a metal, or a metal oxide in such cases.

EXAMPLE

Now having described the embodiments of the sorbents in general, the Examples describe some embodiments of the sorbents and uses thereof. The following is a non-limiting illustrative example of an embodiment of the present disclosure that is not intended to limit the scope of any embodiment of the present disclosure, but rather is intended to provide some experimental conditions and results. Therefore, one skilled in the art would understand that many experimental conditions can be modified, but it is intended that these modifications be within the scope of the embodiments of the present disclosure.

Example 1

Removal of $CO_2$ from gas streams is emerging as an important technical challenge for a variety of applications, and in particular to reducing or offsetting emissions related to the burning of fossil fuels for power. Directly reducing emissions typically involves capturing the $CO_2$ from a large point source such as power plant flue gas before it can enter the atmosphere. Offsetting emissions, in some cases, can involve removing $CO_2$ directly from the atmosphere after it has already been emitted; this is often referred to as direct air capture, or DAC.

The use of solid sorbents in $CO_2$ capture from power plant flues as well as ambient air is regarded as promising, but yet still developing technologies. There are a variety of solid sorbents that have been proposed and demonstrated for $CO_2$ capture from gas streams similar to flue gas and air. These include zeolites, metal oxides, MOFs, activated carbons, and amine modified analogues of most of these porous materials. The amine modified materials are often referred to a 'supported amine adsorbents' and are particularly promising for $CO_2$ capture from ultra-dilute gas streams such as air due to their chemisorptive interaction with $CO_2$. There are several methods of incorporating amine molecules into the pores of a support material that have been grouped into three classes depending on the method. Class 1 sorbents rely on the physical impregnation of molecules or polymers into the pore space of the host; class 2 sorbents are created via the grafting of an amine containing silane to the pore surface of the host; and class 3 sorbents are created via the in-situ polymerization of reactive monomers that graft and polymerize from the pore surface into the pore volume.

In general, aspects of the present disclosure provide a supported amine material, incorporating a physically impregnated poly(propylenimine) (PPI) as the amine, that can be used as a $CO_2$ sorbent in a variety of $CO_2$ capture applications. In particular, the sorbent is advantageous in applications of $CO_2$ capture from gas streams containing low concentrations of $CO_2$, ranging from below that in air up to and exceeding that in flue gas. In the sorbents described here, PPI is used as an amine containing molecule distributed in the pore volume of a porous support media to create the $CO_2$ sorbent. However, compared to sorbents created with poly(etheylenimine) (PEI), sorbents based on PPI show increased $CO_2$ capture efficiency and stability to oxidative degradation, providing them advantages. Sorbents based on PPI are regenerative at temperatures near 100° C., and are meant for use in regenerative adsorption processes including temperature swing, pressure swing, steam swing, or combinations thereof.

It was found that sorbents based on PPI have improved efficiency in $CO_2$ capture processes and increased stability to extended oxidative treatment compared to PEI, irrespective of molecular weight, distribution of amine type, or backbone structure. Thus, PPI may be used in place of PEI to create a more effective sorbent in any prior art teaching the use of a sorbent created with PEI to capture $CO_2$ in an adsorptive process.

Aspects of the present disclosure material differ from currently known solid sorbents that are subsequently impregnated into the pores of a porous support. These differences may be the result of the starting material and preparation steps that result in materials with differing structure and performance. Aspect of the disclosure can have a polymer architecture that may be linear or dendritic, as well as branched or hyperbranched.

Previous academic literature suggested that structures containing only primary and tertiary amines are more stable to oxidative degradation than those containing secondary amines. However, it is shown here that linear PPI, containing nearly exclusively secondary amines, has a similar resistance to oxidation as dendritic PPI, which contains exclusively primary and tertiary amines (i.e. no secondary amines). Further, both molecular structures of PPI are substantially more resistant to oxidation than structures of PEI. This is manifested in a greater retention of $CO_2$ capacity in PPI sorbents compared to PEI sorbents following accelerated $O_2$ degradation tests at 110° C. for 24 h. It is further confirmed by spectroscopic investigation of the sorbents before and after the exposure. Example 7-10 and 15 show the loss in $CO_2$ capacity before and after, revealing the large differences between PPI and PEI sorbents supported in SBA-15 silica. Further, examples 8-10 show NMR, IR, and MS data of both PEI and PPI before and after the $O_2$ exposure. As such, one may expect that in a $CO_2$ capture process involving the exposure, or potential exposure, of $O_2$ to a sorbent, PPI will provide a longer lifetime than PEI.

Figures 3, 4:
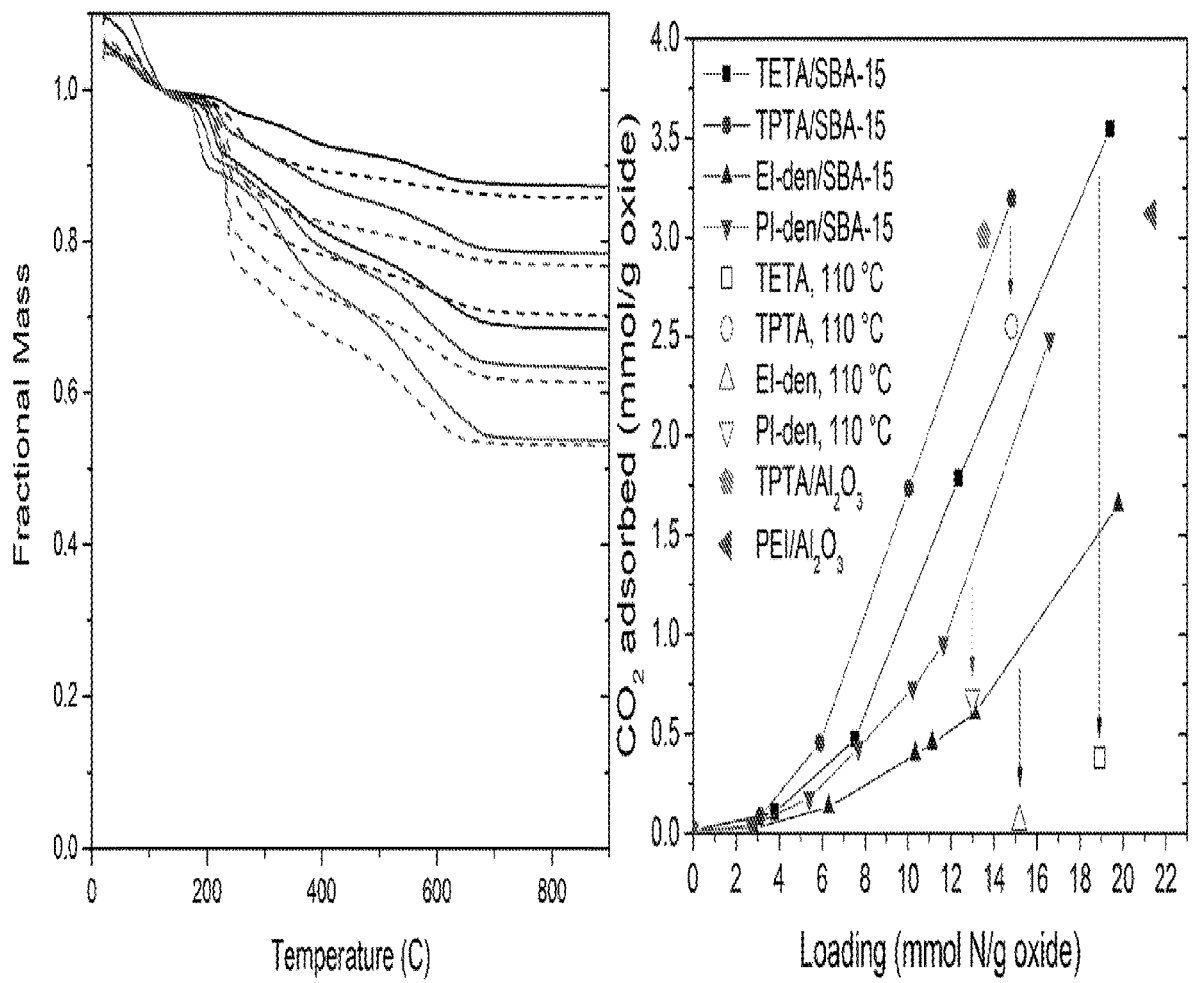
FIG. 3 shows TGA of EI-den (solid lines) and PI-den (dashed lines) impregnated in SBA-15 at various weight loadings (from 10% to 50%, corresponding to roughly 2-20 mmol N per gram SBA-15).
FIG. 4 is an example of the $CO_2$ capacity of test sorbents before and after oxidation in SBA-15 and mesoporous $Al_2O_3$.

In addition to improved stability to $O_2$, PPI is a more efficient $CO_2$ capture agent in a supported amine material than PEI. FIG. 4 shows the capture capacity (expressed per gram of support material) as a function of polymer loading for model linear and dendritic PPI and PEI sorbents. For a given structure (linear or dendritic), the PPI sorbents capture between 20-50% more $CO_2$ than PEI sorbents. This may be related to differences in basicity of the various amines. The basicity (pKa) of an amine increases as the alkyl linker that is attached to it gets longer (trend from $C_2$ to $C_6$) and the nearest neighbor interactions decrease. The increase in pKa from this so called 'polyelectrolyte effect' may affect the $CO_2$ capture capability positively, allowing a greater fraction of amines to retain a high affinity towards $CO_2$ at low partial pressures.

It is found that the molecular weight of the polymer can alter the $CO_2$ capture performance at high loadings on the support, but does not alter the resistance to oxidation. Higher molecular weight polymers induce a greater degree of diffusion resistance to $CO_2$, resulting in lower observed capture capacities. As such, in a preferred embodiment PPI of molecular weight 200-30,000 g/mol is used in a sorbent. In a further preferred embodiment, PPI of molecular weight 600-5,000 g/mol is used in a sorbent. In a further preferred embodiment, the polymer is linear, branched or hyperbranched in structure.

While the majority of examples disclosed here utilize SBA-15 as a support, the body of literature on supported amine adsorbents created with PEI allows extrapolation of these results to embodiments created with many other support types. This literature shows that the PEI can be effective in $CO_2$ capture applications when distributed support materials of varying chemical nature, given that the pore volume, pore size and surface area fall within certain ranges. Specifically, high performing sorbents are created when PEI is distributed in supports containing pore volumes >0.5 cc/g, pore sizes >5 nm and surface areas >100 $m^2/g$. This has been demonstrated on supports comprised of silica, alumina, porous polymer, activated carbon, zeolites, MOFs, cellulose, and others. As such, it can be reasoned that PPI will also be effective as the polymer component of a sorbent supported on any similar support media, given the comparative performance demonstrated on SBA-15 silica, and given that the textural properties fall within the range noted above. Indeed, a comparison of $CO_2$ uptake performance of TPTA, used as a molecule demonstrative of the entire PPI structure and molecular weight family, shows similar performance of PPI when supported on an alumina substrate compared to a SBA-15 silica substrate. In a preferred embodiment, polymer is loaded into the porous support at a volumetric fill fraction corresponding to 20-120% of the pore volume of the substrate. As an example, SBA-15 containing a pore volume of ~1 $cm^3/g$ was loaded to levels of between 2-20 mmol N/g $SiO_2$; this corresponds to weight loadings of 10% and 50%, and, assuming polymer density of ~1 cc/g, fractional volume fillings of 10% and 100%. In a further preferred embodiment, PPI is supported on a hydrothermally stable substrate such as mesoporous alumina.

The sorbent may take the form of a powder, pellet, extrudate, foam laminate sheet or set of sheets, or honeycomb monolith. PPI may be incorporated as the active component of the sorbent in each of the form factor categories above. A particularly effective embodiment for the removal of $CO_2$ from air and mixtures of flue gas and air is the use of a porous honeycomb monolith, created from or functionalized with a supported amine $CO_2$ sorbent. Therefore, in a preferred embodiment the supported PPI sorbent takes the form of a honeycomb monolith. This may be as a washcoat applied to a honeycomb shaped substrate, as a homogeneous but porous honeycomb shaped monolith, as a filler applied to a highly porous or skeletal substrate, or any other manner by which the sorbent would take the form of a honeycomb. Further, the polymer component of the sorbent may be applied to a preformed honeycomb, as in an impregnation or washcoating treatment. Such a polymer coating may take place in a solvent that dissolves the polymer and is subsequently evaporated. Conversely, the honeycomb may also be formed out of a polymer laden powder sorbent. In a preferred embodiment, the monolith walls contain porosity in the range of 5-100 nm totaling 0.5-2 cc/g of pore volume to host the polymer sorbent. In a further preferred embodiment, the monolith walls also contain pores >100 nm totaling >0.5 cc/g of pore volume to facilitate rapid gas transport to and from the polymer sorbent.

It is expected that the temperature at which the $CO_2$ process operates will affect the capture performance of the sorbent. A strong temperature dependence on the adsorption performance is found for PPI sorbents here, with the Henry's law region of the $CO_2$ isotherm shifting to higher pressures at higher temperatures. Therefore, in a preferred embodiment, the adsorption process is performed at temperatures up to 75° C., and regeneration is performed at a temperature of 65-150° C.

Example 2

Synthesis of SBA-15 Mesoporous $SiO_2$ 24 g of Pluronic P123 block copolymer (($EO)_{20}(PO)_{70}(EO)_{20}$) was dissolved in 636 g of deionized water and 120 mL of 12.1 M HCl. The components were stirred vigorously for 3 h, until everything dissolved. 46.6 g of tetraethyl orthosilicate (TEOS) was added dropwise to the mixture and stirred at 40° C. for 20 h, during which time a white precipitate formed. The solution was then heated to 100° C. and held for 24 h in the absence of stirring. The reaction was quenched with 400 mL deionized water and the precipitate was filtered and washed copiously with deionized water. The filtered precipitate was dried for 12 h in an oven at 75° C., and then calcined according to the following program: heat to 200° C. at 1.2° C./min, hold at 200° C. for 1 h, heat to 550° C. at 1.2° C./min, hold at 550° C. for 12 h, cool to room temperature. The resulting white powder was stored in ambient lab conditions.

Example 3

Synthesis of mesoporous $Al_2O_3$

To an acidic solution containing 1.27 g nitric acid (70%) and 200 mL DI $H_2O$, 13.75 g of psuedoboehmite (Catapal B, 74.3% $Al_2O_3$) was added and stirred. The resulting suspension was sonicated at room temperature for 90 minutes, and then further stirred at 60° C. for 17 hours. After cooling to room temperature, a pre-equilibrated mixture of 200 mL of ethanol (200 proof) and 15.3 g Pluronic P123 was slowly added to the suspension. The resultant mixture was stirred at room temperature for 24 hours before the solvent was slowly evaporated by stirring in an open beaker at 60° C. for 60 hours, followed by further drying in an oven at 75° C. for 24 hours. Finally, the resulting gel was calcined at 700° C. for 4 hours, with a 1° C./min ramp and an intermediate drying step at 150 C for 1 hour, to remove the surfactant and form a mesoporous gamma phase alumina powder.

Example 4

Synthesis of EI-Den

To a solution of 1,3-dibromopropane (0.28 mL, 2.74 mmol) and $K_2CO_3$ (1.90 g, 13.77 mmol) in anhydrous $CH_3CN$ at room temperature, bis(2-azidoethyl)amine (0.85 g, 5.48 mmol) dissolved in $CH_3CN$ was added dropwise. The mixed solution was then stirred and heated at 80° C. for 48 h. The solid was removed by filtration and the filtrate was concentrated in vacuo. The residue was purified by column chromatography over silica gel using EA/Hex=1:1 (v/v) as the eluent. The proper fractions were combined, and the solvent was evaporated to yield a yellow oil.
$Ph_3P$ (4.50 g, 17.16 mmol) was dissolved in THF and $H_2O$ mixed solution (10:1 v/v) at room temperature, and the yellow oil (0.5 g, 1.43 mmol) dissolved in THF was added. The solution was then stirred and heated at 80° C. for 48 h. TLC was used to monitor the completion of reaction. THF was removed by rotary evaporation and the product was extracted with iced $H_2O$. The product (EI-den) was collected by evaporation of $H_2O$ and obtained as light brown oil and stored at −20° C. (0.24 g, 68%).
$^1$H NMR (400 MHz, $CDCl_3$, δ): 2.77-2.74 (t, J=6.0 Hz, 8H), 2.51-2.45 (m, 12H), 1.89 (s, 8H), 1.66-1.59 (quint, J=7.2 Hz, 2H). $^{13}$C NMR (100 MHz, $CDCl_3$, δ): 57.12, 52.59, 39.71, 24.96. ESI-MS (m/z): [M+H]$^+$ calculated for $C_{11}H_{31}N_6$: 247.2605, found: 247.2604.

Example 5

Synthesis of PI-Den

To a solution of bis(3-hydroxypropyl)amine (3.3 g, 25 mmol) in chloroform at 0° C., thionyl chloride (11.9 g, 100 mmol) dissolved in chloroform was added dropwise. The solution was then stirred for 24 h at room temperature. The solvent was evaporated, and the crude product was purified by recrystallization from $CHCl_3$ to yield bis(3-chloropropyl)amine as a white solid (3.9 g, 92%).
A solution of bis(3-chloropropyl)amine (1.7 g, 10 mmol) and sodium azide (3.3 g, 50 mmol) in water was heated at 80° C. for 24 h. After evaporating most of the water, the solution was made basic with sodium hydroxide and then extracted with diethyl ether. The organic phase was combined and dried over potassium carbonate. After evaporating the solvent, the residue was purified by column chromatography over silica gel using EA/Hex=1:1 (v/v) as the eluent. The proper fractions were combined, and the solvent was evaporated to yield compound bis(3-azidopropyl)amine as yellow oil (1.3 g, 71%).
To a solution of 1,3-dibromopropane (0.28 mL, 2.74 mmol) and $K_2CO_3$ (1.90 g, 13.77 mmol) in anhydrous $CH_3CN$ at room temperature, bis(3-azidopropyl)amine (1.00 g, 5.48 mmol) dissolved in $CH_3CN$ was added dropwise. The mixed solution was then stirred and heated at 80° C. for 48 h. The solid was removed by filtration and the filtrate was concentrated in vacuo. The residue was purified by column chromatography over silica gel using EA/Hex=1:1 (v/v) as the eluent. The proper fractions were combined, and the solvent was evaporated to yield a yellow oil (0.96 g, 86%).
$Ph_3P$ (4.50 g, 17.16 mmol) was dissolved in THF and $H_2O$ mixed solution (10:1 v/v) at room temperature, and the yellow oil (0.58 g, 1.43 mmol) dissolved in THF was added. The solution was then stirred and heated at 70° C. for 48 h. TLC was used to monitor the completion of reaction. THF was removed by rotary evaporation and the product was extracted with iced $H_2O$. The product (PI-den) was collected by evaporation of $H_2O$ and obtained as light brown oil and stored at −20° C. (0.3 g, 70%).
$^1$H NMR (400 MHz, $CDCl_3$, δ): 2.74-2.70 (t, J=6.8 Hz, 8H), 2.47-2.43 (t, J=7.2 Hz, 8H), 2.43-2.38 (t, J=7.2 Hz, 4H), 1.69 (s, 8H), 1.62-1.55 (m, 10H). $^{13}$C NMR (100 MHz, $CDCl_3$, δ): 52.22, 51.84, 40.69, 30.81, 24.51. ESI-MS (m/z): [M+H]$^+$ calculated for $C_{15}H_{39}N_6$: 303.3231, found: 303.3230.

Example 6

Preparation of Aminopolymer/Oxide Composite

SBA-15 in Example 2 or mesoporous alumina in Example 3 was impregnated with the liquid aminopolymers (commercially-available triethylenetetraamine (TETA), tripropylenetetraamine (TPTA), EI-den as in Example 4, PI-den as in Example 5) by wet impregnation. SBA-15 or mesoporous alumina was dried overnight at 110° C. under vacuum (<20 mTorr). The desired amount of amine was dissolved in 10 mL methanol and was added to 200 mg SBA-15 or mesoporous alumina. The mixture was allowed to stir for at least 6 h. Methanol was removed in vacuo at room temperature. The resulting powder was dried overnight at room temperature under vacuum (<20 mTorr). The resulting dried powder composites were stored in ambient lab conditions.

Thermogravimetric analysis was performed on a Netzsch STA409PG TGA to determine the weight loading of aminopolymer in the composite material, shown in FIG. 3. Weight loss between 120° C. and 900° C. was taken to represent the organic content of the material. The determined weight loadings correspond to roughly 2-20 mmol N per gram SBA-15.

Example 7

Oxidative Treatment of Aminopolymers

Approximately 100 mg neat liquid aminopolymer (commercially-available triethylenetetraamine (TETA), tripropylenetetraamine (TPTA), EI-den as in Example 4, PI-den as in Example 5) was placed in a two-neck round-bottom flask equipped with reflux condenser. A flow of ultra-zero grade air was introduced into the flask via a needle and bubbled into the liquid. While stirring, the liquid was heated to the desired oxidation temperature (typically 110° C.) and held for 24 h. Subsequently, the liquid was cooled to room temperature. Oxidatively-treated-aminopolymer/SBA-15 composites were prepared via the procedure in Example 6.

Example 8

Adsorption of $CO_2$ by Supported Aminopolymer Composites

Equilibrium $CO_2$ adsorption capacities were measured gravimetrically on a TA Instruments Q500 TGA. The materials in Examples 6 and 7 were pretreated by heating to 70° C. at a ramp rate of 5° C./min under a flow of $N_2$ and held for 2 h. The samples were cooled to 35° C. and equilibrated at this analysis temperature for 1 h. Subsequently, the gas flow was switched to a premixed gas containing 400 ppm $CO_2/N_2$ for 3 h. The mass gain was recorded, converted to amount of $CO_2$ adsorbed, and normalized by the dry mass of the sample.

There are three trends that emerge from FIG. 4 that have important implications for $CO_2$ capture. The first is that the propyl-spaced molecules (TPTA, PI-den) outperform their ethyl-spaced analogues (TETA, EI-den) across the range of loadings and architectures evaluated in both SBA-15 and mesoporous Al2O3. The second is that the linear molecules (TETA, TPTA) outperform the analogous dendrimers (EI-den, PI-den) and randomly branched (PEI) across the range of loadings evaluated. The third is that the propyl-spaced molecules retain a significant amount of $CO_2$ capacity after oxidation at 110° C., while the ethyl-spaced molecules lose nearly all of their capacity following oxidation at 110° C. Additionally, TPTA supported in mesoporous alumina performs similar to that in SBA-15.

Example 9

Study of Aminopolymer Oxidation by FTIR

Fourier transform infrared (FTIR) spectra were recorded under vacuum on a Bruker Vertex 80v optical bench with a DLaTGS detector. Approximately 2 mg of the sample was diluted by 100 mg KBr and pelletized for analysis.

Figures 5, 6:
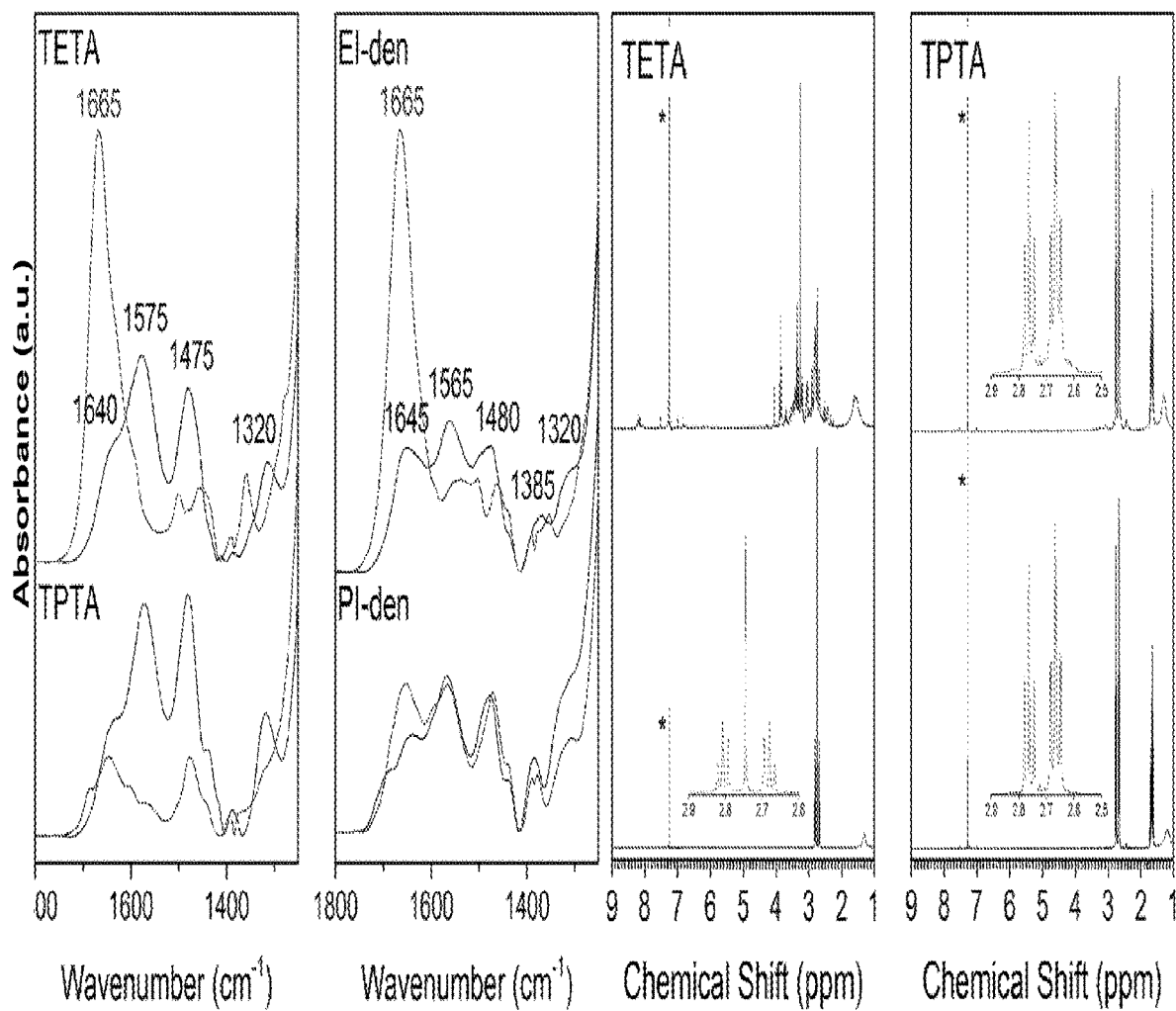
FIG. 5 provides FTIR spectra of each of the aminopolymers tested before (black) and after (red, light gray) oxidation at 110° C.
FIG. 6 shows examples of $^1H$ NMR of the linear probe molecules TETA (left) and TPTA (right) before (top, red, light gray) and after (bottom, black) oxidation at 110° C. * indicates the solvent peak ($CDCl_3$)

FIG. 5 shows the FTIR spectrum of each of the oxidized sorbents normalized to the Si—O—Si framework bending mode at 460 $cm^{-1}$. For all sorbent materials, the expected stretches above 2500 $cm^{-1}$ are observed, corresponding to NH, OH, and $CH_2$ stretches. After oxidation, some of these stretches decrease in intensity, but no other peaks appear, as expected. The stretches near 1640, 1570 and 1475 $cm^{-1}$ correspond vibrations of the aminopolymers and ammonium carbamate ion pairs formed by capture of $CO_2$ from ambient air.[6-9] Below this region, the vibrational spectra are dominated by modes from the support, and so are not discussed here.

After the oxidative treatment, an intense peak at 1665 $cm^{-1}$ appeared in the spectra for the ethylenimine sorbents TETA and EI-den; this peak has been attributed to the stretching mode of C=N or C=O groups, consistent with oxidation of the aminopolymers. This oxidation product is correlated with the sharp loss in $CO_2$ capacity. In contrast, the peak at 1665 $cm^{-1}$ did not appear with significant intensity for the propylenimine sorbents TPTA and PI-den, consistent with retention of $CO_2$ capacity as seen in the results above. To confirm that the oxidation trends observed here were not due to the use of liquid-phase aminopolymers, essentially identical oxidation experiments were performed after impregnating the SBA-15 with aminopolymer molecules. The results of the liquid-phase and impregnated sorbent oxidation experiments resulted in similar changes in all cases: a peak at 1665 $cm^{-1}$ appeared in the spectra for both TETA and EI-den. TPTA and PI-den still did not appear to oxidize to a significant extent, but the intensity of the stretches for TPTA decreased significantly, indicating loss of organic content due to evaporation during the 110° C. thermal treatment.

Example 10

Study of Aminopolymer Oxidation by NMR

Solution-phase NMR experiments were carried out on the neat and oxidatively-treated molecules. These data are given in FIG. 6 below. Prior to oxidation, TETA shows peaks at 2.81, 2.74, 2.68 ppm corresponding to the three types of methylene protons in the molecules. After exposure to flowing air at 110° C., many peaks appear in the 2.0-4.5 ppm region, indicating many new types of methylene protons. Importantly, peaks in the 8.0-8.3 ppm region of the $^1H$ spectrum appear, suggesting formation of imine (—CH=N—) and/or amide (—C(=O)NH) species. These assignments are supported by the appearance of carbon shifts at 160-165 ppm, which have also been previously assigned to imine and amide species formed after oxidation of aminopolymers.

In contrast, there was very little change in the TPTA $^1H$ and $^{13}C$ NMR spectra after oxidative treatment, corroborating the observations from the IR spectra that TPTA was not oxidized significantly.

Example 11

Study of Aminopolymer Oxidation by ESI-MS

Figure 7:
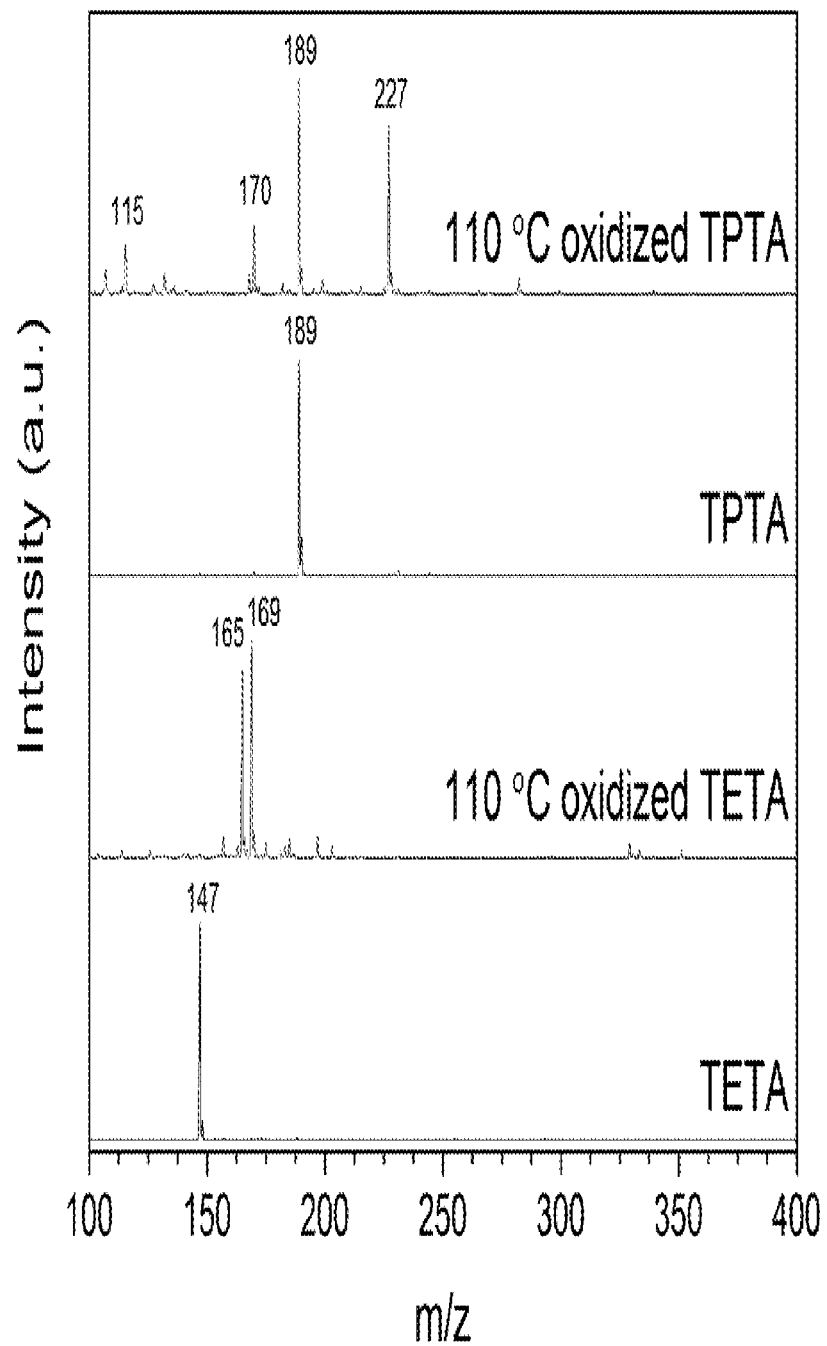
FIG. 7 provides ESI mass spectra for (black) fresh and (red) oxidatively-treated linear aminopolymer TETA and TPTA.
Figure 8:
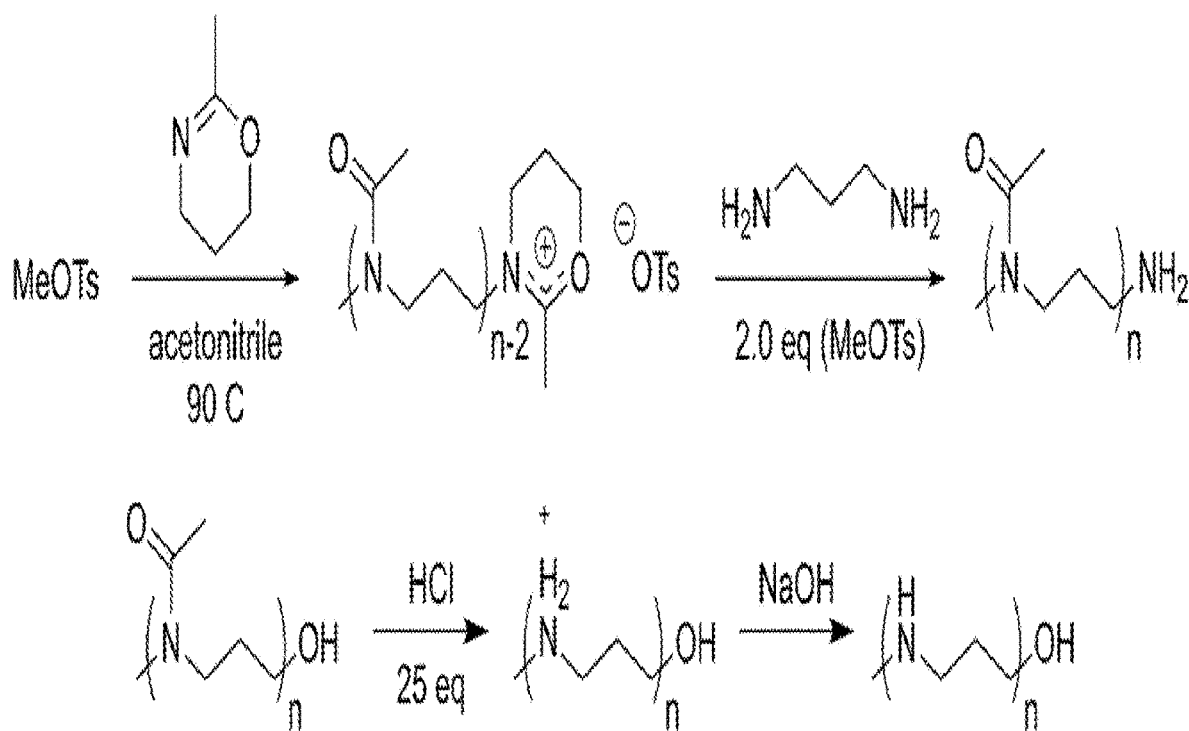
FIG. 8 is an example of synthesis of LPPI via cationic ring-opening polymerization of 2-MeOxazine with methyl tosylate as the initiator.

Electrospray ionization mass spectrometry (ESI-MS) experiments were performed to examine the formation of oxidized and thermally rearranged products (FIG. 7). TETA was characterized by a single peak at m/z=147, corresponding to singly protonated TETA, as expected. After oxidation, this peak disappeared completely and was replaced by peaks at m/z=169 and 165, suggesting that all of the TETA molecules had been oxidized. These masses are consistent with thermal rearrangement and/or dehydrogenation reactions and addition of up to two oxygen atoms, consistent with formation of imines and amides, in agreement with IR and NMR studies.

Example 12

Synthesis of 2-methyl-5,6-dihydro-4H-1,3-oxazine (2-MeOxazine)

2-methyl-5,6-dihydro-4H-1,3-oxazine (2-MeOxazine) was synthesized by reacting acetonitrile with 3-aminopropan-1-ol over anhydrous $ZnCl_2$. $ZnCl_2$ was dissolved in acetonitrile, and 3-aminopropan-1-ol was added dropwise at room temperature, allowing the evolving $NH_3$ to vent. Once all of the 3-aminopropan-1-ol was added, the system was purged with dry Ar and heated to 95° C. and held stirring for 48 h. After cooling to room temperature, excess acetonitrile and ammonia were removed under vacuum. 2-MeOxazine was isolated by distillation under vacuum at 65° C., cooling with a dry ice/isopropyl alcohol mixture, to afford a clear and colorless inviscid liquid. $^1$H NMR ($CDCl_3$, 400 MHz, δ): 4.12-4.15 (t, J=6.0 Hz, 2H), 3.31-3.34 (t, J=6.0 Hz, 2H), 1.87-1.81 (q, J=6.0 Hz, 2H), 1.86 (s, 3H).

Example 13

Synthesis of Linear Poly(propylenimine) LPPI

Prior to polymerization, 2-MeOxazine in Example 12 was dried over $CaH_2$ by stirring at 65° C. 2-MeOxazine was collected into a Straus flask by distillation under vacuum at 65° C. and cooling with a dry ice/isopropyl alcohol mixture. After distillation was complete, the 2-MeOxazine was stored under Ar and transferred into a dry box. Acetonitrile was dried over $CaH_2$ by stirring at 65° C., and was collected into a Straus flask by distillation under vacuum at 30° C., stored under Ar and transferred into a dry box.

10 g 2-MeOxazine in the dry box was transferred into a round bottom flask, to which 50 mL acetonitrile was added. An amount of methyl tosylate initiator was added, based on the desired final molecular weight of the polymer. The round bottom flask was sealed with a rubber septum and heated to 90° C. to initiate polymerization. Polymerization was allowed to proceed for 48 h, after which 2.0 equivalents of 1,3-diaminopropane was added to quench the reaction. The acetonitrile and residual 1,3-diaminopropane was removed under vacuum to recover a viscous yellow liquid, denoted as poly(oxazine).

Poly(oxazine) was converted to linear PPI by acid hydrolysis of the side chains. 200 mL of 5 M aqueous HCl was added to the poly(oxazine) residue and stirred at 100° C. for 48 h. The residual polymer was concentrated under vacuum; the concentration process largely removed the acetic acid byproduct along with aqueous HCl. The concentrated polymer was cooled in an ice bath and brought to pH 14 using concentrated aqueous NaOH, which caused the polymer to first become fully dissolved, and then precipitate as an off-white powder. Linear PPI (LPPI) was recovered by centrifugation and washed copiously with 10% ammonium hydroxide to remove any residual inorganic salt. The final polymer was dissolved in methanol and dried under high vacuum to afford an off-white solid. By varying the 2-MeOxazine to initiator ratio, the molecular weight of the LPPI could be reliably controlled from approximately 600 g/mol to 36000 g/mol.

Example 14

Preparation of LPPI/SBA-15 Composites

Figure 9:
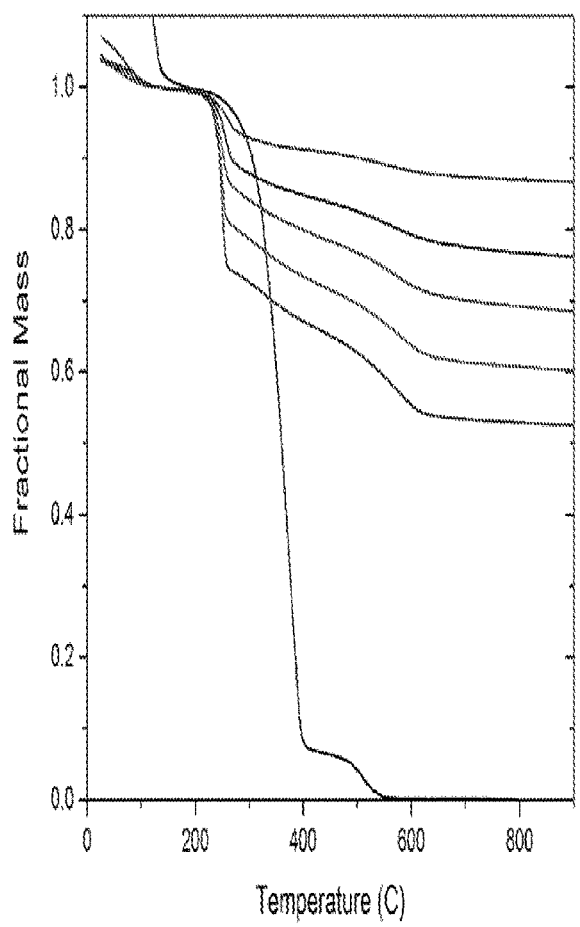
FIG. 9 provides an example of TGA of neat LPPI at 36000 g/mol (black), and LPPI impregnated in SBA-15 at various weight loadings (from 10%-50%, corresponding to roughly 2-20 mmol N per gram SBA-15).

LPPI of varying molecular weight in Example 13 was impregnated into SBA-15 at a range of weight loadings corresponding to roughly 2-20 mmol N per gram SBA-15 (FIG. 9) using a similar procedure to that in Example 6. The PPI weight loading was determined using a similar procedure to that in Example 6.

Example 15

Oxidative Treatment of LPPI/SBA-15 Composites

A fraction of the LPPI/SBA-15 composite in Example 14 was also subjected to oxidative treatment by exposing the sample to a flow of 21% $O_2$ at 110° C. for 24 h. Subsequently the samples were cooled to room temperature.

Example 16

Adsorption of $CO_2$ by LPPI/SBA-15 Composites

'Equilibrium $CO_2$ adsorption capacities of LPPI/SBA-15 composites in Examples 14 and 15 in 400 ppm $CO_2$ and 35° C. were measured gravimetrically on a TA Instruments Q500 TGA in a similar procedure as in Example 8.

Figure 10:
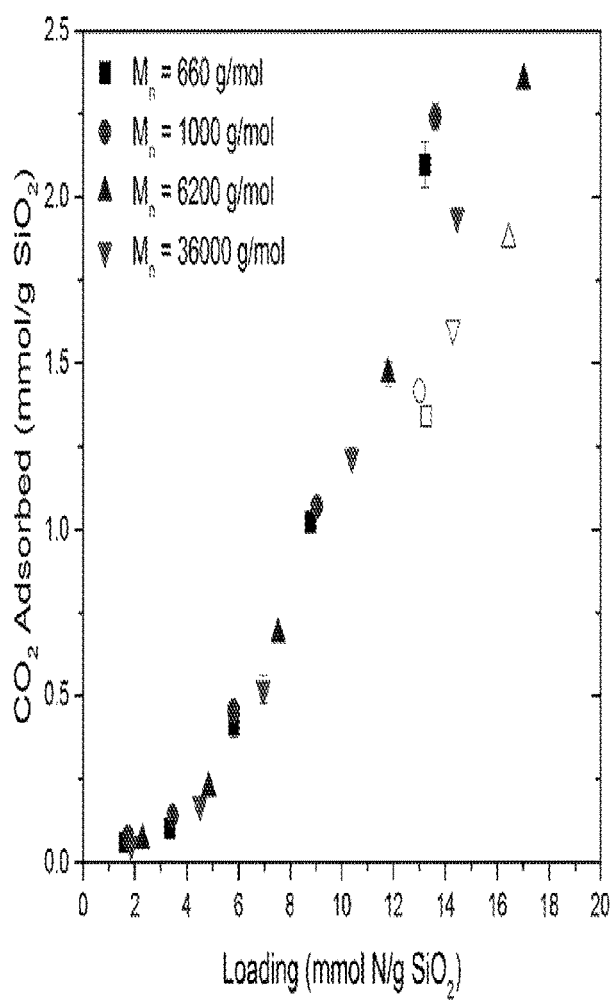
FIG. 10 is an example of $CO_2$ capacity of linear PPI (LPPI) impregnated in SBA-15 before (closed symbols) and after oxidation (open symbols).

As seen in FIG. 10, there were no large differences in the $CO_2$ adsorption capacity as a function of amine loading for LPPI over several orders of magnitude in molecular weight. All molecular weights of LPPI appeared to retain a significant amount of $CO_2$ capacity after the oxidative treatment at 110° C. However, it appeared that higher molecular weights of LPPI retained more of the $CO_2$ capture capacity, possibly due to differences in the ability for $O_2$ to diffuse through the large and densely packed LPPI chains.

Example 17

Study of LPPI Oxidation by FTIR

Figure 11:
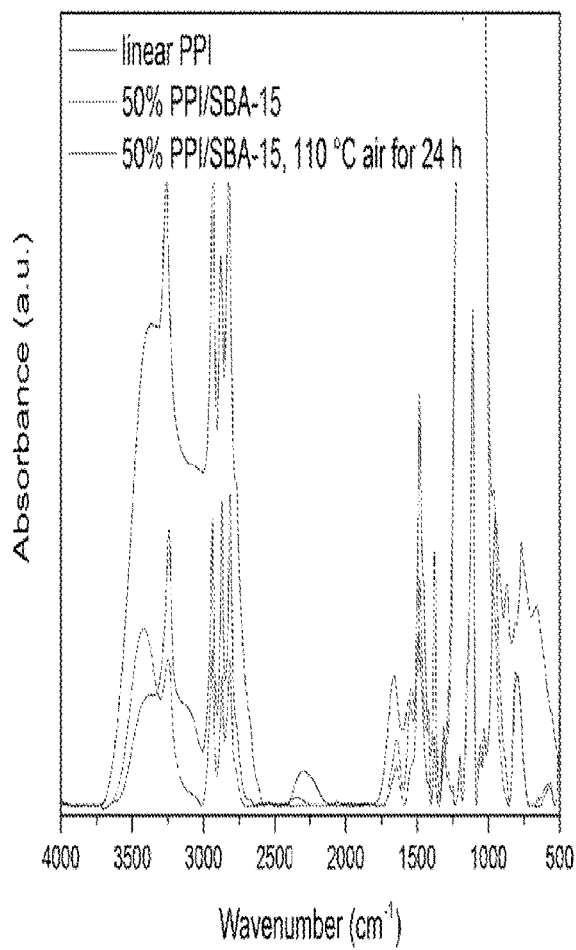
FIG. 11 shows complete FTIR spectra of neat LPPI (black), and LPPI supported in SBA-15 before (blue, medium gray) and after (red, light gray) oxidative treatment at 110° C.

Evidence for formation of imine or amide species was tested by FTIR spectroscopy on LPPI impregnated in SBA-15 before and after oxidation, FIG. 11, with a similar procedure to that in Example 9. There was no evidence for the appearance of a sharp band around 1665 $cm^{-1}$, suggesting that LPPI was not oxidized to a significant extent during this treatment. Therefore, we attribute the loss in $CO_2$ capacity seen in FIG. 10 to rearrangement reactions in the harsh oxidative environment, which could cause formation of tertiary amines, which are not active for $CO_2$ capture under our conditions.

Example 18

Figure 12:
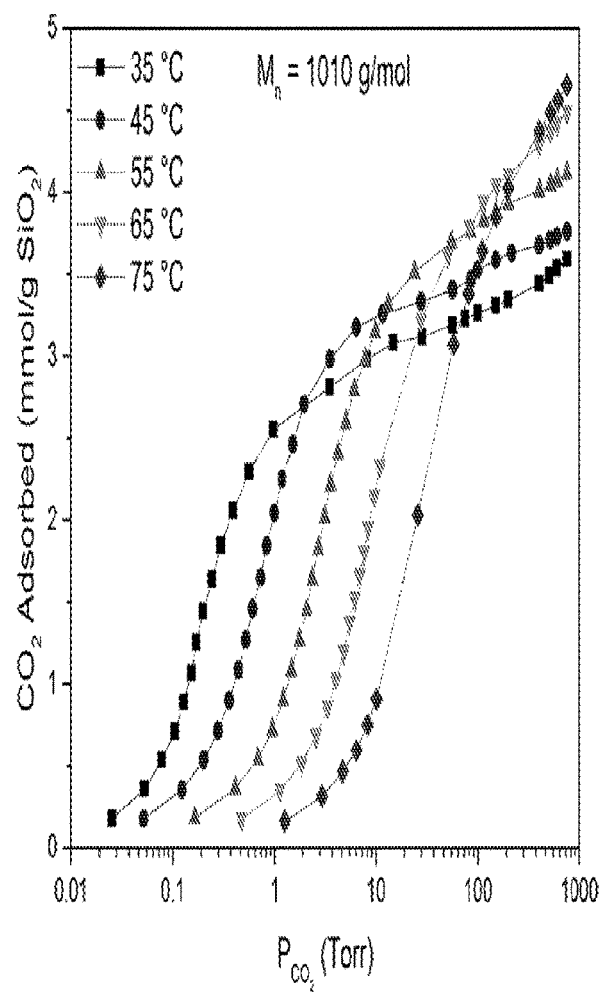
FIG. 12 is an example of $CO_2$ adsorption isotherms for LPPI impregnated in SBA-15.

Adsorption of $CO_2$ by LPPUSBA-15 as a Function of Temperature and Pressure $CO_2$ uptake on LPPI/SBA-15 was studied as a function of $CO_2$ pressure and adsorption temperature in a Micromeritics ASAP 2020. The materials were dried in a sample tube under vacuum at 110° C. for 12 h prior to conducting the isotherm measurement (FIG. 12). At low temperature, LPPI adsorbs at all partial pressures tested, with a large fraction of the uptake occurring in the low pressure (<1 Torr) region. As the temperature of adsorption is increased, the pressure region in which sharp uptake occurs shifts to higher pressure, indicating that a larger thermodynamic driving force is required for adsorption at higher temperature. At high pressure of $CO_2$, around 100 Ton, the amount of $CO_2$ adsorbed appears to increase as temperature increases, suggesting that access to adsorption sites is hindered at lower temperatures. After a critical temperature, the thermodynamic driving force decreases to an extent such that accessibility no longer is the issue, and the amount of $CO_2$ adsorbed begins to decrease.

Example 19

Synthesis and Neutralization of Branched Poly(propylenimine) (BPPI)

Branched PPI was synthesized via cationic ring opening polymerization of azetidine. The synthesis was carried out according to Goethals et al. [Schacht, E. H.; Goethals, E. J. Cationic Polymerization of Cyclic Amines, 3. Polymerization of Azetidine. Die Makromol. Chemie 1974, 175 (12), 3447-3459 DOI: 10.1002/macp.1974.021751211] in methanol solvent and perchloric acid (70% in $H_2O$) as the initiator in a 25 mL pressure tube. First, 0.11 g of azetidine was added to 2 mL of stirring methanol in a 25 mL pressure tube with a given amount of acid initiator. The pressure tube was capped and placed in a heated oil bath (343-353 K). The reaction progress was monitored via $^1$H-NMR and stopped after several hours (<150 h). The polymer was concentrated by rotary evaporation and then neutralized. BPPI and 10 mL water were added to 25 mL AMBERSEP 900 (OH) basic resin and stirred for 12 h at room temperature. The resin was removed from the PPI solution by filtration and rinsed with water; the polymer in solution was concentrated by rotary evaporation. $^1$H-NMR was used to quantify molecular weight based on the relative ratio of residual rings to polymeric species.

Example 20

Preparation of Neutralized BPPI/SBA-15 Composites

BPPI in Example 19 was impregnated into SBA-15 by a similar procedure in Example 6. SBA-15 was dried at 383 K under vacuum (<20 mTorr) overnight; 200 mg of SBA-15 was stirred in 10 mL methanol. The desired amount of amine polymer was dissolved in 5 mL methanol and added to the SBA-15 slurry; the mixture was allowed to stir for at least 6 h at room temperature. Methanol was removed in vacuo at room temperature, resulting in a powder that was then dried overnight at room temperature under vacuum (<20 mTorr). Organic content of the samples was estimated on a Netzsch STA409PG TGA by combustion. Mass loss from 398 to 1173 K under a flow of nitrogen-diluted air was recorded (FIG. 13).

Comparative Example C1

Preparation Untreated and $NH_4OH$-treated BPPUSBA-15 Composites

BPPI was synthesized according to Example 19. Comparative polymers were made by either leaving the polymer untreated after synthesis or dissolving the polymer in 7.5 M $NH_4OH$ solution in water and stirred for 6 h at room temperature, followed by rotary evaporation. Each polymer was impregnated into SBA-15 as stated by Example 20.

Example 21

Adsorption of $CO_2$ by BPPUSBA-15 Composites $CO_2$ adsorption capacities of BPPI/SBA-15 in Example 19 and Example Cl were measured gravimetrically on a TA Instruments Q500 TGA using a procedure similar to that in Example 8. The samples were pretreated by heating to 383 K at a ramp rate of 5 K/min under a flow of $N_2$ and held for 3 h. The samples were cooled to 308 K and equilibrated for 1 h. The gas flow was switched to a premixed gas containing 10% $CO_2/N_2$ for 3 h. The adsorption capacities were calculated from the weight gain after the $CO_2$ exposure.

The sorbents made with polymer neutralized by the basic resin had higher $CO_2$ capacity than those made with untreated polymer at both polymer loadings tested (FIG. 14). Further, the $CO_2$ capacity increased for the resin-neutralized polymer at higher polymer loading in the SBA-15 (14.2 mmol N/g silica versus 8.2 mmol N/g silica) by a factor of 13 (FIG. 14). The calculated $CO_2$ capacity for the $NH_4OH$ neutralized polymer at ~2 mmol N/g silica was higher than for the untreated polymer (0.11 mmol $CO_2$/g silica versus 0.078 mmol $CO_2$/g silica), but lower than the resin treated polymer (0.15 mmol $CO_2$/g silica).

Elemental analysis (Atlantic Microlab. Inc) indicated the presence of chlorine (i.e. perchloric salt, perchloricate ion coordinated to a protonated amine, or residual acid) in the sorbents made with resin-treated polymer (0.04 mol Cl/mol N; Table 1), but at much lower values than sorbents made with either the untreated polymer or the polymer treated with $NH_4OH$ (0.26-0.34 mol Cl/mol N). This result, combined with the increased $CO_2$ capacities, suggests these sorbents have a higher concentration of free amines

TABLE 1

Counterion content (and C/N molar ratios) for sorbents made with untreated, $NH_4OH$ neutralized, and resin-neutralized BPPI.

| Sorbent (wt %) | mol C/mol N | mol Cl/mol N |
| --- | --- | --- |
| BPPI (10) | 3.1 | 0.26 |
| BPPI_$NH_4OH$ (10) | 3.8 | 0.34 |
| BPPI_resin (37) | 3.4 | 0.040 |

Example 22

Analysis of Mass Loss Curves on BPPI/SBA-15 Composites

Figure 15:
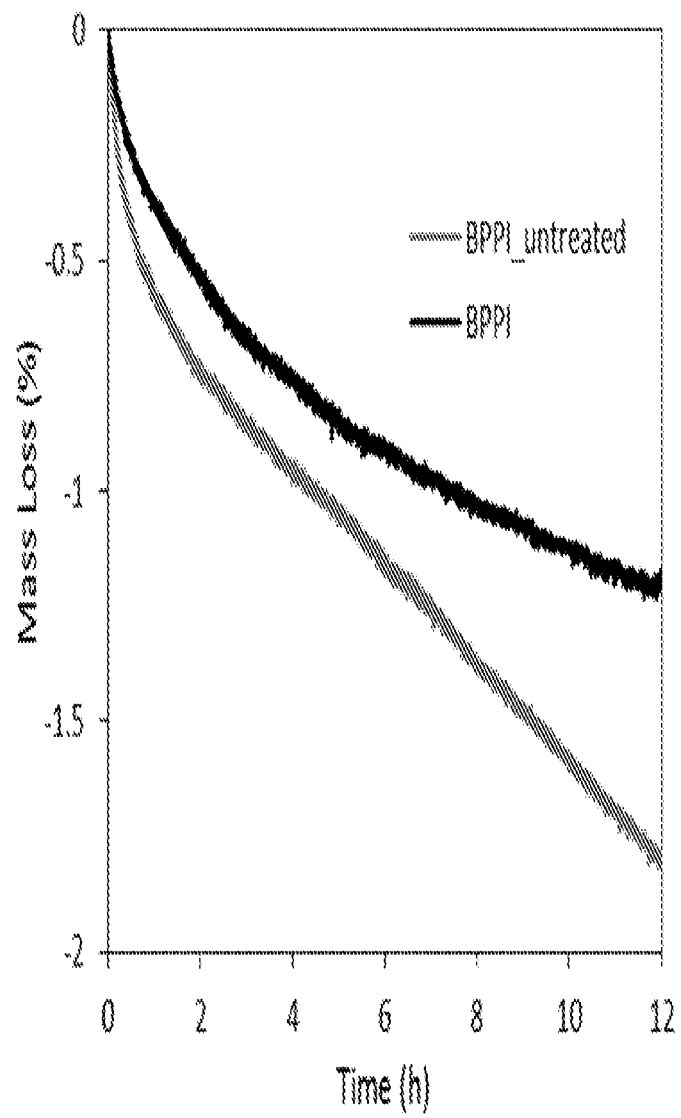
FIG. 15 shows normalized mass loss curves determined from TGA analysis for different PPI polymers (initial azetidine:perchloric acid concentration ratio=3.7 and temperature=343 K, after 144 hours polymerization) loaded in SBA-15 at 15 at 1.79-2.2 mmol N/g silica: (bottom) as synthesized and (top) neutralized by basic resin.

The sorbent made with the resin-neutralized polymer showed less significant mass loss determined by TGA than the sorbent with the untreated polymer (FIG. 15). This suggests that smaller, more volatile oligomers were absorbed in the resin.

Example 23

Analysis of Amine Distribution in Neat BPPI by NMR

Figure 16:
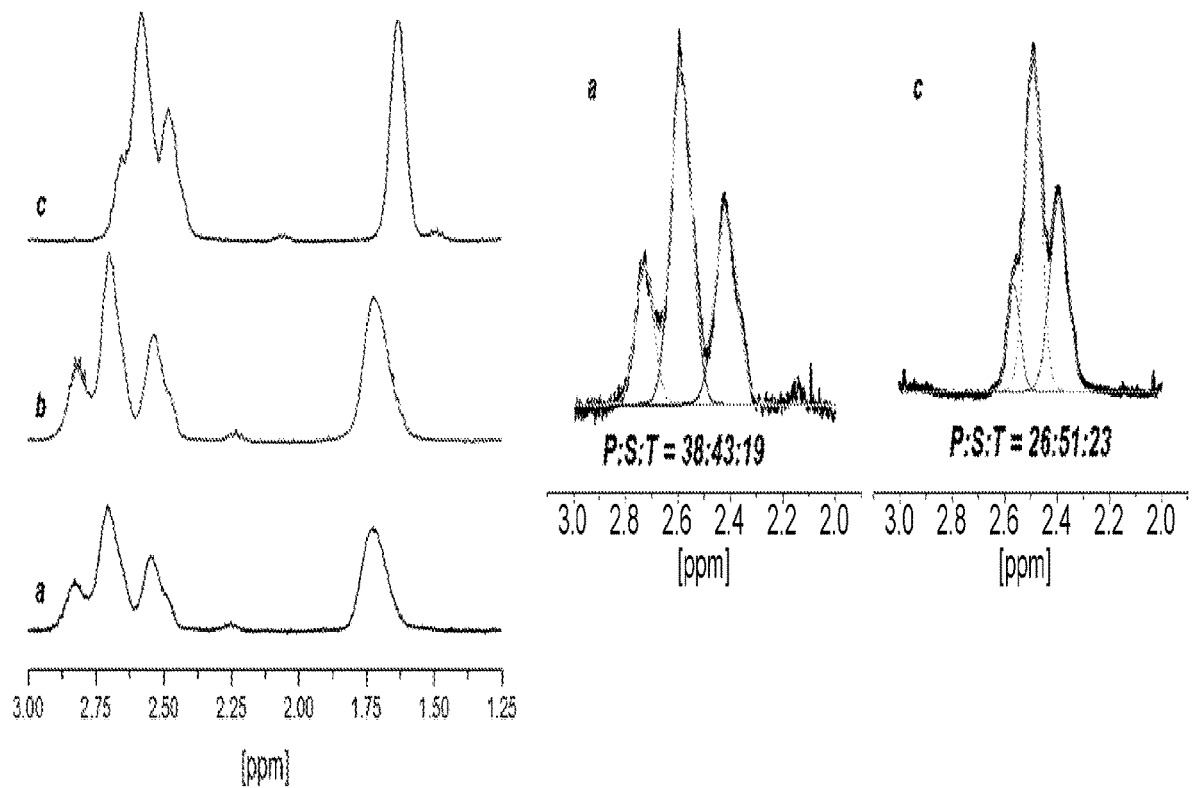
FIG. 16 shows distribution of amines in different PPI polymers (initial azetidine:perchloric acid concentration ratio=3.7 and temperature=343 K, after 144 hours polymerization): (sample a) untreated, (sample b) neutralized by $NH_4OH$, and (sample c) neutralized by basic resin as calculated from $^1H$-NMR in $D_2O$. The full spectra are shown at left with the peak deconvolution of samples a and c shown at right.

All $^1$H-NMR spectra of BPPI in Examples 19 and C1 in $D_2O$ yielded relative ratios of primary, secondary, and tertiary amines based on prior reports for peak assignments in $CDCl_3$ [ref] and available NMR predictive software. These results were bolstered with inversely-gated $^{13}C$ NMR studies, which verified the distribution of amine types. The degree of branching, as calculated by $^1$H-NMR (FIG. 16), were similar for the polymer as synthesized and the polymer neutralized with $NH_4OH$ (primary:secondary:tertiary=38:43:19). However, the distribution changed and the NMR peaks shifted upfield for the polymer that was neutralized with the basic resin; most notably, the number of primary amines decreases by 12% (primary:secondary:tertiary=26:51:23). The shift upfield is consistent with the deprotonation of amines. The decrease in primary amines is consistent with mass loss curves in Example 22 that suggest smaller molecular weight oligomers, with high distribution of primary amines, were absorbed in the resin.

It should be noted that ratios, concentrations, amounts, dimensions, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a range of "about 0.1% to about 5%" should be interpreted to include not only the explicitly recited range of about 0.1% to about 5%, but also include individual ranges (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to the numerical value and measurement technique. In addition, the phrase "about 'x' to 'y'" includes "about 'x' to about 'y'".

It should be emphasized that the above-described embodiments of this disclosure are merely possible examples of implementations, and are set forth for a clear understanding of the principles of this disclosure. Many variations and modifications may be made to the above-described embodiments of this disclosure without departing substantially from the spirit and principles of this disclosure. All such modifications and variations are intended to be included herein within the scope of this disclosure and protected by the following claims.

Therefore, the following is claimed:

1. A material comprising:
a porous structure having supported thereon a poly(propylenimine) (PPI) sorbent, wherein the PPI sorbent is in a plurality of pores of the porous structure, wherein the PPI sorbent comprises a linear PPI, a branched PPI, a hyperbranched PPI, or a combination thereof;
wherein the PPI sorbent is physically impregnated in the porous structure and not covalently bonded to the porous structure;
wherein the PPI sorbent has a loading of about 10% to 75% by weight of the composite and a counterion content, wherein the counterion content is present and less than about 0.1 mol counterion/mol amine.

2. The material of claim 1, wherein the porous structure is mesoporous.

3. The material of claim 2, wherein the porous structure is supported on a structure.

4. The material of claim 1, wherein the porous structure is selected from the group consisting of: silica, alumina, aluminosilicates, zirconia, germania, magnesia, titania, hafnia, iron oxide, mixed oxides composed of those elements, and a combination thereof.

5. The material of claim 1, wherein the porous structure is a honeycomb structure.

6. The material of claim 5, wherein the porous honeycomb structure is a honeycomb structure monolith.

7. The material of claim 1, wherein the porous structure is a powder, a pellet, a foam, a laminate, an extrudate, or a combination thereof.

8. The material of claim 1, wherein the porous structure is a gas permeable scaffold having a porous surface.

9. The material of claim 8, wherein the porous surface is a porous layer on the gas permeable scaffold.

10. The material of claim 9, wherein the porous layer is selected from the group consisting of: alumina, silica, and aluminosilica.

11. The material of claim 1, wherein the PPI sorbent comprises a branched PPI that includes one or more of each of: a primary amine, a secondary amine, and a tertiary amine.

12. A material comprising:
a porous structure having supported thereon a linear poly(propylenimine) (PPI) sorbent, wherein the linear PPI sorbent is in a plurality of pores of the porous structure, wherein the PPI sorbent is covalently bonded within pores of the porous structure, wherein the linear PPI sorbent has a loading of about 10% to 75% by weight of the composite and a counterion content, wherein the counterion content is present and less than about 0.1 mol counterion/mol amine.

13. The material of claim 12, wherein the linear PPI includes only primary amines, secondary amines, or both primary amines and secondary amines.

14. The material of claim 12, wherein the porous structure is mesoporous.

15. The material of claim 14, wherein the porous structure is selected from the group consisting of: silica, alumina, aluminosilicates, zirconia, germania, magnesia, titania, hafnia, iron oxide, mixed oxides composed of those elements, and a combination thereof.

16. The material of claim 12, wherein the porous structure is a honeycomb structure.

17. The material of claim 16, wherein the porous honeycomb structure is a honeycomb structure monolith.

18. The material of claim 12, wherein the porous structure is a powder, a pellet, a foam, a laminate, an extrudate, or a combination thereof.

19. The material of claim 12, wherein the porous structure is a gas permeable scaffold having a porous surface.

20. The material of claim 19, wherein the porous surface is a porous layer on the gas permeable scaffold.

21. The material of claim 14, further comprising a porous layer disposed on the surface of the porous structure, wherein a portion of the PPI sorbent is in a plurality of pores of the porous layer.

22. The material of claim 21, wherein the porous layer is selected from the group consisting of: alumina, silica, and aluminosilica.

\* \* \* \* \*